US012654842B2

(12) United States Patent
Beno et al.

(10) Patent No.: US 12,654,842 B2
(45) Date of Patent: **\*Jun. 16, 2026**

(54) TILT ROTOR SYSTEMS AND METHODS FOR EVTOL AIRCRAFT

(71) Applicant: Archer Aviation, Inc., San Jose, CA (US)

(72) Inventors: Jonathan Anthony Beno, Bellevue, WA (US); Guy Bernard, Kirkland (CA); Benjamin Scott Dyer, Huntsville, AL (US); Nathan Daniel Storrs, Woodinville, WA (US)

(73) Assignee: Archer Aviation Inc., San Jose, CA (US)

( \* ) Notice: Subject to any disclaimer, the term of this patent is extended or adjusted under 35 U.S.C. 154(b) by 174 days.

This patent is subject to a terminal disclaimer.

(21) Appl. No.: 18/488,378

(22) Filed: Oct. 17, 2023

(65) Prior Publication Data

US 2024/0300658 A1 Sep. 12, 2024

Related U.S. Application Data

(63) Continuation of application No. 18/098,417, filed on Jan. 18, 2023, now Pat. No. 11,820,499.

(Continued)

(51) Int. Cl.
*B64C 11/02* (2006.01)
*B60L 15/06* (2006.01)
(Continued)

(52) U.S. Cl.
CPC .............. *B64C 11/02* (2013.01); *B60L 15/06* (2013.01); *B60L 15/38* (2013.01); *B64C 27/54* (2013.01);
(Continued)

(58) Field of Classification Search
CPC ..... B64C 29/0033; B64C 27/54; B64C 27/58; B64C 27/56; B64C 27/605; B64C 27/78;
(Continued)

(56) References Cited

U.S. PATENT DOCUMENTS 2,015,150 A \* 9/1935 Maxwell ................. B64C 3/385
244/101
3,404,852 A \* 10/1968 Sambell .............. B64C 29/0033
416/142

(Continued)

FOREIGN PATENT DOCUMENTS

GB 1199595 A \* 7/1970 ......... B64C 29/0033

OTHER PUBLICATIONS

PCT International Search Report and Written Opinion in corresponding PCT application PCT/US2023/075799, mailed Dec. 14, 2023, 10 pages.

*Primary Examiner* — Assres H Woldemaryam
(74) *Attorney, Agent, or Firm* — Finnegan, Henderson, Farabow, Garrett & Dunner, LLP

(57) ABSTRACT

A system includes a first frame for mounting to the aircraft; a second frame for mounting the proprotor, the second frame being rotatably mounted to the first frame; a first gear located along the rotation axis of the second frame and fixed in position relative to the first frame; a pinion that moves with the second frame and engages the first gear such that the pinion revolves around the first gear, causing the pinion to rotate; a cam that is fixedly connected to the pinion such that the cam rotates with the pinion; and a control rod operatively coupled at a first end with the cam such that rotation of the cam can cause translation of the control rod, wherein the control rod can be coupled at a second end to the blades of the proprotor such that translation of the control rod alters the pitch of the blades.

50 Claims, 19 Drawing Sheets

Related U.S. Application Data

(60) Provisional application No. 63/378,680, filed on Oct. 7, 2022, provisional application No. 63/378,536, filed on Oct. 6, 2022.

(51) Int. Cl.

| | |
|---|---|
| *B60L 15/38* | (2006.01) |
| *B64C 27/54* | (2006.01) |
| *B64C 29/00* | (2006.01) |
| *B64D 27/30* | (2024.01) |
| *B64D 27/31* | (2024.01) |
| *B64D 27/34* | (2024.01) |
| *B64D 27/359* | (2024.01) |
| *B64D 31/18* | (2024.01) |
| *B64D 33/08* | (2006.01) |
| *B64D 35/02* | (2006.01) |
| *B64D 35/021* | (2024.01) |
| *B64D 35/026* | (2024.01) |
| *F16B 2/06* | (2006.01) |
| *F16H 57/08* | (2006.01) |
| *H02K 1/27* | (2022.01) |
| *H02K 1/32* | (2006.01) |
| *H02K 5/124* | (2006.01) |
| *H02K 5/20* | (2006.01) |
| *H02K 7/08* | (2006.01) |
| *H02K 7/116* | (2006.01) |
| *H02K 9/19* | (2006.01) |
| *H02K 11/33* | (2016.01) |
| *H02K 15/03* | (2006.01) |
| *H02K 15/035* | (2025.01) |
| *H02K 15/40* | (2025.01) |
| *H02M 7/5395* | (2006.01) |
| *H02P 21/00* | (2016.01) |
| *H02P 25/16* | (2006.01) |
| *H02P 27/06* | (2006.01) |
| *H02P 27/08* | (2006.01) |
| *H02K 7/00* | (2006.01) |

(52) U.S. Cl.
CPC ...... *B64C 29/0008* (2013.01); *B64C 29/0033* (2013.01); *B64D 27/30* (2024.01); *B64D 27/31* (2024.01); *B64D 27/34* (2024.01); *B64D 27/359* (2024.01); *B64D 31/18* (2024.01); *B64D 33/08* (2013.01); *B64D 35/02* (2013.01); *B64D 35/021* (2024.01); *B64D 35/026* (2024.01); *F16B 2/06* (2013.01); *F16H 57/08* (2013.01); *H02K 1/27* (2013.01); *H02K 1/32* (2013.01); *H02K 5/124* (2013.01); *H02K 5/203* (2021.01); *H02K 7/08* (2013.01); *H02K 7/116* (2013.01); *H02K 9/19* (2013.01); *H02K 11/33* (2016.01); *H02K 15/03* (2013.01); *H02K 15/035* (2025.01); *H02K 15/40* (2025.01); *H02M 7/5395* (2013.01); *H02P 21/50* (2016.02); *H02P 25/16* (2013.01); *H02P 27/06* (2013.01); *H02P 27/08* (2013.01); *B60L 2200/10* (2013.01); *B60L 2210/40* (2013.01); *H02K 7/006* (2013.01); *H02K 2215/00* (2021.08)

(58) Field of Classification Search
CPC . B64C 11/02; B64C 29/0008; B64C 29/0025; B64C 11/30; B64C 5/02; B64C 27/12; B64D 27/30; B64D 27/31; B64D 27/34; B64D 27/359; B64D 31/18; B64D 33/08; B64D 35/02; B64D 35/021; B64D 35/026; B64D 2045/009; B64D 2221/00; B64D 33/10; Y02T 50/60
See application file for complete search history.

(56) References Cited

U.S. PATENT DOCUMENTS

| | | | | |
|---|---|---|---|---|
| 3,514,052 | A | 5/1970 | Mckeown | |
| 4,979,698 | A | 12/1990 | Lederman | |
| 5,997,054 | A * | 12/1999 | Baudu | F02K 1/766 |
| | | | | 292/201 |
| 10,279,892 | B2 * | 5/2019 | Bosworth | B64C 3/385 |
| 10,301,008 | B1 | 5/2019 | Reichert | |
| 10,479,482 | B1 | 11/2019 | Kuentzel et al. | |
| 10,640,207 | B2 * | 5/2020 | Lee | B64D 35/04 |
| 10,994,828 | B2 | 5/2021 | Reichert | |
| 2006/0237581 | A1 * | 10/2006 | Gerbino | B64C 27/32 |
| | | | | 244/17.11 |
| 2010/0072325 | A1 * | 3/2010 | Sambell | B64C 11/28 |
| | | | | 244/7 A |
| 2018/0339771 | A1 * | 11/2018 | Oldroyd | B64C 29/0033 |
| 2019/0329882 | A1 * | 10/2019 | Baity | B64U 30/14 |
| 2021/0214070 | A1 | 7/2021 | Reichert | |
| 2021/0362849 | A1 | 11/2021 | Bower et al. | |
| 2022/0396355 | A1 * | 12/2022 | Depape | B64D 27/31 |

* cited by examiner

TILT ROTOR SYSTEMS AND METHODS FOR EVTOL AIRCRAFT

CROSS-REFERENCE TO RELATED APPLICATIONS

This application is a continuation of U.S. application Ser. No. 18/098,417, filed Jan. 18, 2023, which claims the benefit of U.S. Provisional Application No. 63/378,536, filed Oct. 6, 2022, and U.S. Provisional Application No. 63/378,680, filed Oct. 7, 2022, the entire contents of each of which are incorporated herein by reference.

FIELD

The present disclosure relates generally to aircraft, and more specifically, to aircraft with tiltable proprotors.

BACKGROUND

Vertical take-off and landing (VTOL) aircraft are aircraft that can take-off and land vertically and hover. To take-off and land vertically and hover, VTOL aircraft can include one or more proprotors that can be tilted between a position for providing vertical thrust for take-off and landing and hover and a position for providing forward thrust for forward flight. VTOL aircraft can include wings like conventional fixed-wing aircraft that provide lift during forward flight.

The pitch of the blades of a proprotor affect the efficiency and thrust of the proprotor. It is often desirable to adjust a pitch of the blades for different operational regimes. For example, when the proprotors are positioned for providing vertical thrust, it may be desirable to have the blades at a pitch that maximizes thrust, but when the proprotors are positioned for providing forward thrust during cruise, it may be desirable to have the blades at a pitch that provides greater efficiency. Blade pitch control actuators may be used to enable adjustment of blade pitch during flight.

SUMMARY

A proprotor tilt and blade pitch adjustment system for a VTOL aircraft mechanically links the pitch of the blades of a proprotor of the aircraft to the tilt angle of the proprotor such that the blade pitch can adjust as the proprotor tilt angle changes. By mechanically linking blade pitch adjustment with proprotor tilting, blade pitch can be coordinated with proprotor tilt position for achieving more efficient proprotor performance without requiring a dedicated blade pitch adjustment actuator, which can save power, weight, and cost.

The proprotor is tiltably mounted to the aircraft and includes one or more actuators that tilt the proprotor. At least one fixed gear is fixed in position relative to the aircraft. A pinion can be rotatably connected to a tiltable frame to which the proprotor is mounted and can engage with the fixed gear such that as the pinion gear moves with the tiltable frame, the pinion revolves around the fixed gear, which causes the pinion to rotate. A cam can be connected to the pinion such that the cam rotates along with the pinion. A control rod can be operatively coupled to the cam such that as the cam rotates the control rod follows the profile of the cam, which can cause the control rod to translate depending on the profile). The control rod can be operatively connected to the blades of the proprotor such that as the control rod translates, the pitch of the blades of the proprotor are adjusted. Thus, as the proprotor is tilted about the tilt axis, the pitch of the blades of the proprotor can be adjusted. Accordingly, the system is configured to mechanically link tilting the proprotor and adjusting the pitch of the blades of the proprotor.

It will be appreciated that any of the variations, aspects, features, and options described in view of the systems apply equally to the methods and vice versa. It will also be clear that any one or more of the above variations, aspects, features, and options can be combined.

BRIEF DESCRIPTION OF THE DRAWINGS

The invention will now be described, by way of example only, with reference to the accompanying drawings, in which.

DETAILED DESCRIPTION

Figure 1:
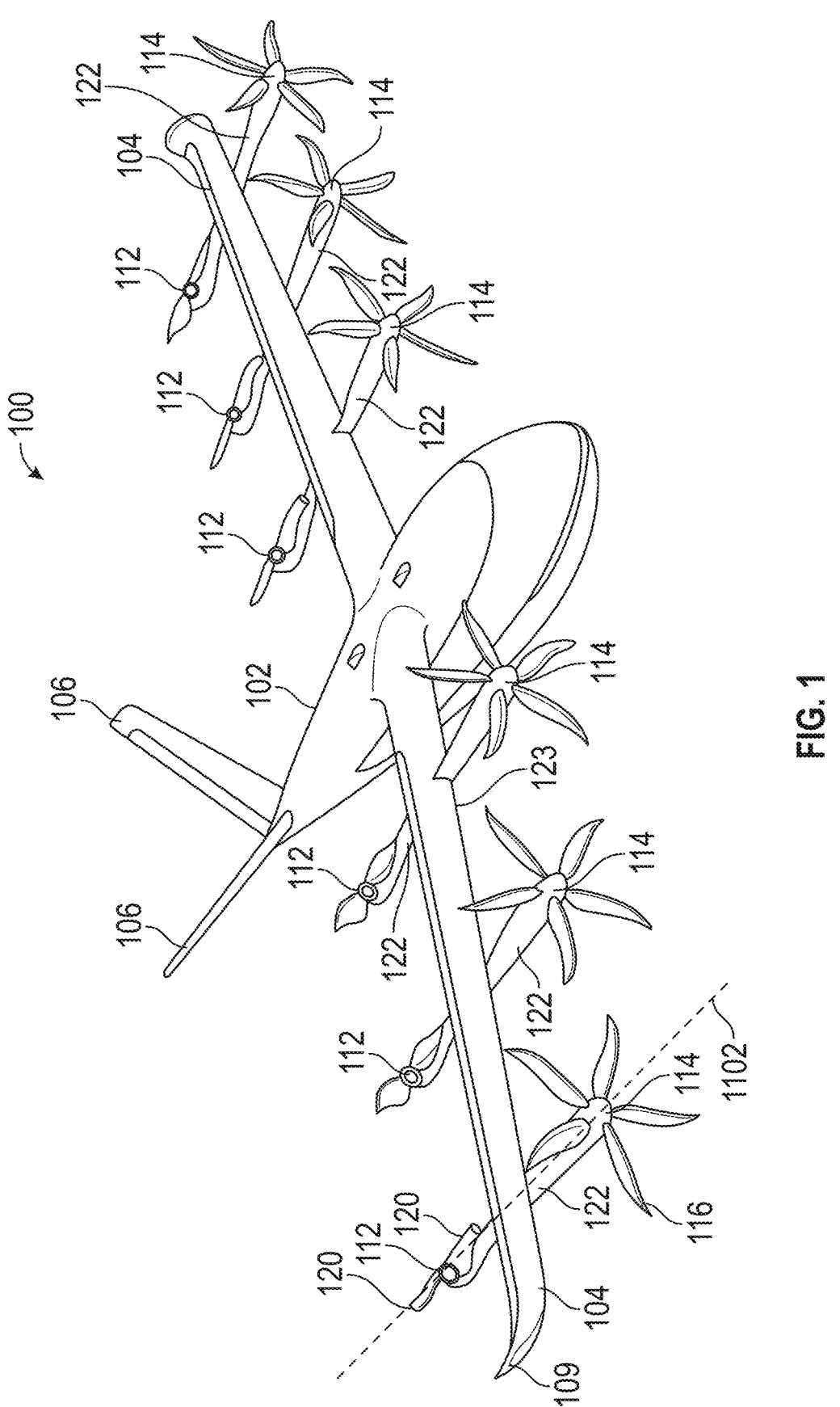
FIG. 1 shows an aircraft in a forward flight configuration, according to one or more examples of the disclosure.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

Described herein are systems and methods for mechanically coupling adjustment of the pitch of the blades of the proprotor with the tilting of a proprotor. Coupling blade pitch to the tilt of the proprotor can enable the operational characteristics of the proprotor to be tuned to the different stages of flight, which can lead to greater efficiency that can result in less energy demand over the course of the flight. The systems and methods described herein enable the blade pitch to be tailored to the different operational regimes of the proprotor while avoiding the need for dedicated blade pitch adjustment actuators. Such dedicated blade pitch adjustment actuators and their associated mounting and wiring systems can add significant weight and cost to the aircraft and create another point of failure. By eliminating the need for such dedicated blade pitch adjustment actuators, the systems and methods described herein can achieve blade pitch adjustment while avoiding the increased weight, cost, and greater points of failure associated with the dedicated blade pitch adjustment actuators.

The system includes a first frame for mounting to a portion of the aircraft, such as the boom or wing of the aircraft, and a second frame to which the proprotor can be mounted. The second frame is tiltably mounted to the first frame at a rotation axis. The second frame is tilted relative to the first frame by at least one actuator, such as a linear actuator that is connected to the second frame eccentrically from the rotation axis. The system includes a first gear located on the rotation axis and fixed in position relative to the first frame and a pinion that moves with the second frame and is engaged with the first gear. As the pinion moves with the second frame, (e.g., along with the second frame as it rotates about the rotation axis) the pinion revolves around at least a portion of the first gear, thereby causing the pinion to rotate. The system includes a cam fixedly connected to the pinion such that the cam rotates with as the pinion rotates. A control rod operatively couples with the cam such that the translational position of the control rod is controlled by the cam. Depending on the cam profile and cam rotational position, the cam can cause the control rod to translate. The control rod is coupled at an opposite end to the blades of the proprotor in such a way that translation of the control rod changes the pitch of the blades. As the proprotor tilts about the tilt axis, the engagement between the first gear and the pinion causes the pinion to rotate, thereby rotating the cam and potentially translating the control rod (depending on the cam profile), which alters the pitch of the blades of the proprotor. Accordingly, the system can adjust the pitch of the blades as the proprotor rotates about the rotation axis.

As used herein, the singular forms "a," "an," and "the" used in the following description are intended to include the plural forms as well unless the context clearly indicates otherwise. It is to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

As used herein, the term "proprotor" refers to a variable tilt propeller in which the direction of thrust of the propeller can be changed by changing the tilt angle of the propeller. For example, the tilt angle can be changed from an angle that provides at least some degree of vertical thrust, such as for vertical take-off and landing, to an angle that provides at least some degree of horizontal thrust, such as for forward flight. As used herein, a proprotor lift configuration refers to any proprotor orientation in which the proprotor thrust is providing primarily lift to the aircraft and proprotor forward flight configuration refers to any proprotor orientation in which the proprotor thrust is providing primarily forward thrust to the aircraft.

As used herein, "vertical take-off and landing" ("VTOL") refers to the capability of an aircraft to move substantially vertically without lift being provided solely by wings of the aircraft. While this term encompasses directly vertical take-off and landing (i.e., vertical movement without any horizontal movement), it also encompasses vertical movement in combination with horizontal movement. It will be understood by a person having ordinary skill in the art that a VTOL aircraft may be capable of non-vertical take-off and landing. For example, a winged VTOL, such as various examples described herein, can take-off and land in a traditional airplane manner utilizing the lift provided by its wings at suitable airspeeds.

FIG. 1 shows an aircraft 100 in a forward flight configuration. The aircraft 100 includes a fuselage 102, wings 104 mounted to the fuselage 102, and one or more rear stabilizers 106 mounted to the rear of the fuselage 102. The aircraft 100 can be a vertical take-off and landing (VTOL) aircraft, and may be a passenger aircraft. A plurality of rotors 112 are mounted to the wings 104 and are configured to provide lift, such as for take-off and landing. A plurality of proprotors 114 are mounted to the wings 104 and are tiltable between lift configurations in which they provide a portion of the lift required for vertical take-off and landing and hovering, and forward flight configurations (as shown in FIG. 1) in which they provide forward thrust to the aircraft 100 for horizontal flight.

During take-off and landing, the proprotors 114 are tilted to lift configurations in which their thrust is directed upward for providing lift. For forward flight, the proprotors 114 tilt from their lift configurations to their forward flight configurations in which their thrust is directed forward for providing forward propulsion. In other words, the pitch of the proprotors 114 is varied from a tilt angle in which the proprotor provides lift for take-off and landing (and, optionally, hover) to a tilt angle in which the proprotor provides forward thrust to the aircraft 100 for forward flight. The proprotors 114 can each be tilted by one or more actuators. The actuator(s) can be electrically powered. Optionally, each proprotor has a single actuator for adjusting its tilt. According to various embodiments, the aircraft 100 can include one or more damper mechanisms connected to each tiltable proprotor configured to limit a rate of change of the tilt angle of the tiltable proprotor, such as in the event that the actuator becomes disconnected or otherwise fails.

When the aircraft 100 is in full forward flight, lift may be provided entirely by the wings 104, and the rotors 112 may be shut-off. The blades 120 of the rotors 112 may be locked in low drags positions for aircraft cruising. In some embodiments, the rotors 112 each have two blades 120 that are locked in minimum drag positions for cruising in which one blade is directly in front of the other blade as illustrated in FIG. 1. In some embodiments, the rotors 112 have more than two blades. In some embodiments, the proprotors 114 include more blades 116 than the rotors 112. For example, as illustrated in FIG. 1, the rotors 112 may each include two blades and the proprotors 114 may each include five blades. According to various embodiments, the proprotors 114 can have from 2 to 5 blades.

According to various embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104. According to some embodiments, all rotors 112 and propro-tors 114 are mounted to the wings—i.e., no rotors or proprotors are mounted to the fuselage. According to various embodiments, the rotors 112 are all located rearwardly of the wings 104 and the proprotors 114 are all located forward of the wings 104. According to some embodiments, all rotors 112 and proprotors 114 are positioned inwardly of the wing tips 109.

According to various embodiments, the rotors 112 and proprotors 114 are mounted to the wings 104 by booms 122. The booms 122 may be mounted beneath the wings 104, on top of the wings, and/or may be integrated into the wing profile. According to various embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge or other system. The proprotor 114 may be mounted to the boom 122 such that the proprotor 114 is aligned with the body of the boom 122 when in its forward flight configuration, forming a continuous extension of the front end of the boom 122 that minimizes drag for forward flight.

The aircraft is operated during take-off and landing by positioning the proprotors in lift configurations and provid-ing the required lift to the aircraft via the combined lift provided by the rotors and proprotors. According to various embodiments, during take-off and landing and/or hover, the proprotors can be maintained in predetermined lift configu-rations that can be the same across all proprotors or different for different proprotors. According to various embodiments, the tilt of at least some of the proprotors can be actively adjusted during take-off and landing and/or hover to provide the required stability and/or maneuvering. As discussed further below, the pitches of the blades of the proprotors (also referred to herein as the pitch angle and angle of attack) are mechanically linked to the tilt of the proprotors such that the blade pitch is coordinated with the proprotor tilt, such as to achieve maximum thrust when the proprotor is in the lift configuration and to achieve increased efficiency when the proprotor is in the forward flight configuration.

According to various embodiments, each rotor and/or each proprotor can be individually controlled by the flight controller according to the various operational degrees of freedom. According to various embodiments, the only degree of freedom of the rotor is the rotational speed of the rotor. According to various embodiments, the degrees of freedom of at least a portion of the proprotors includes the rotational speed of the proprotors, and the degree of tilt of the proprotors (combined with the blade pitch of the pro-protors). According to various embodiments, any of these degrees of freedom can be actively controlled by the flight controller (either autonomously or in response to pilot commands) during take-off and landing in order to provide the appropriate stability and maneuvering.

Once the aircraft has achieved sufficient altitude to com-mence forward flight, the proprotors begin tilting forward toward their forward flight configurations such that their thrust provides a combination of lift and thrust, with a decreasing proportion of lift as the proprotors are tilted further toward their forward flight configurations. The pitch angle of the blades can be adjusted as the proprotors tilt forward toward their forward flight configurations. For instance, in the forward flight configuration, the blades of the proprotor can be at a pitch angle that results in less drag relative to a pitch angle of the blades when in the lift configuration. The rotors can remain active during at least a portion of the period in which the proprotors are tilted forward to continue to provide rotor-based lift. At any point after the forward airspeed is high enough that the wings provide sufficient lift to maintain the aircraft's altitude, the rotors can be deactivated.

The tilt of at least some of the proprotors can be actively controlled to provide additional stability and/or maneuver-ability control during cruising. In some embodiments, the tilt of at least some of the proprotors is actively controlled during take-off and landing and/or hover. In some embodi-ments, the tilt of the proprotors is fixed (i.e., non-varying) during cruise. According to some embodiments, the tilt of the outermost proprotors can be actively and independently controlled during vertical take-off and landing and/or hover to provide yawing moments as needed. The range of tilt angle of the tiltable proprotor(s) is at least 90 degrees, such that the proprotors can tilt between the forward flight configuration and the lift configuration.

Figure 2:
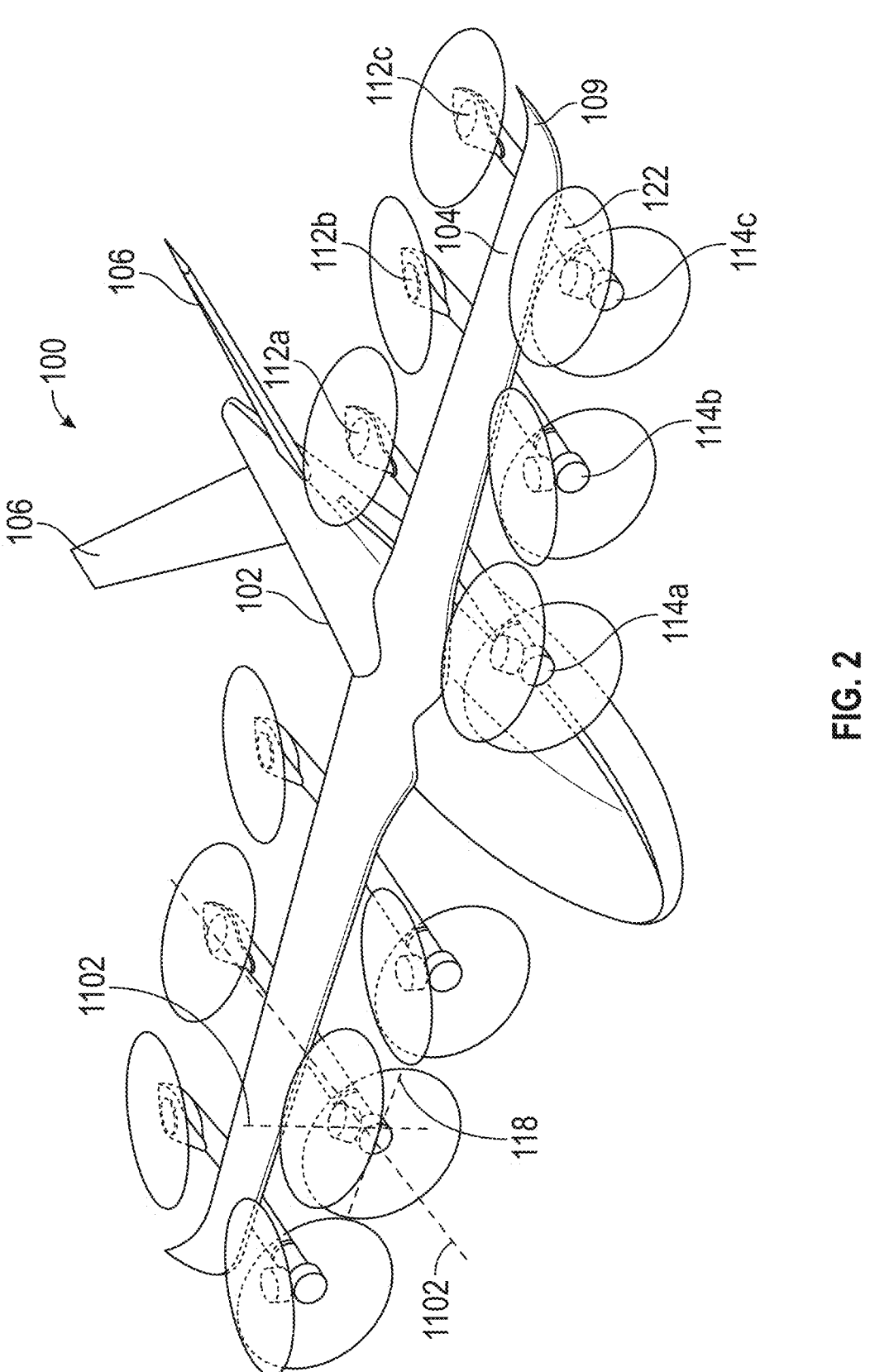
FIG. 2 is a perspective view of the aircraft of FIG. 1 illustrating the proprotor positions in the lift and forward flight configurations, according to one or more examples of the disclosure.

FIG. 2 is a perspective view of the aircraft 100 of FIG. 1 illustrating the proprotor positions in the lift and forward flight configurations, according to one or more examples of the disclosure. The proprotors 114 can tilt about the tilt axis 118 that is perpendicular to the forward direction of the aircraft. For forward flight, the proprotors tilt from the lift configuration, which provides vertical thrust, to a forward flight configuration, which provides forward thrust.

As described further below, the aircraft 100 can include a system to tilt the proprotors 114 between the lift configu-ration and the forward flight configuration. The system can mechanically link adjustment of the pitch angle of the blades of the proprotor 114 to the adjustment of the tilt of the proprotors 114.

Figure 3:
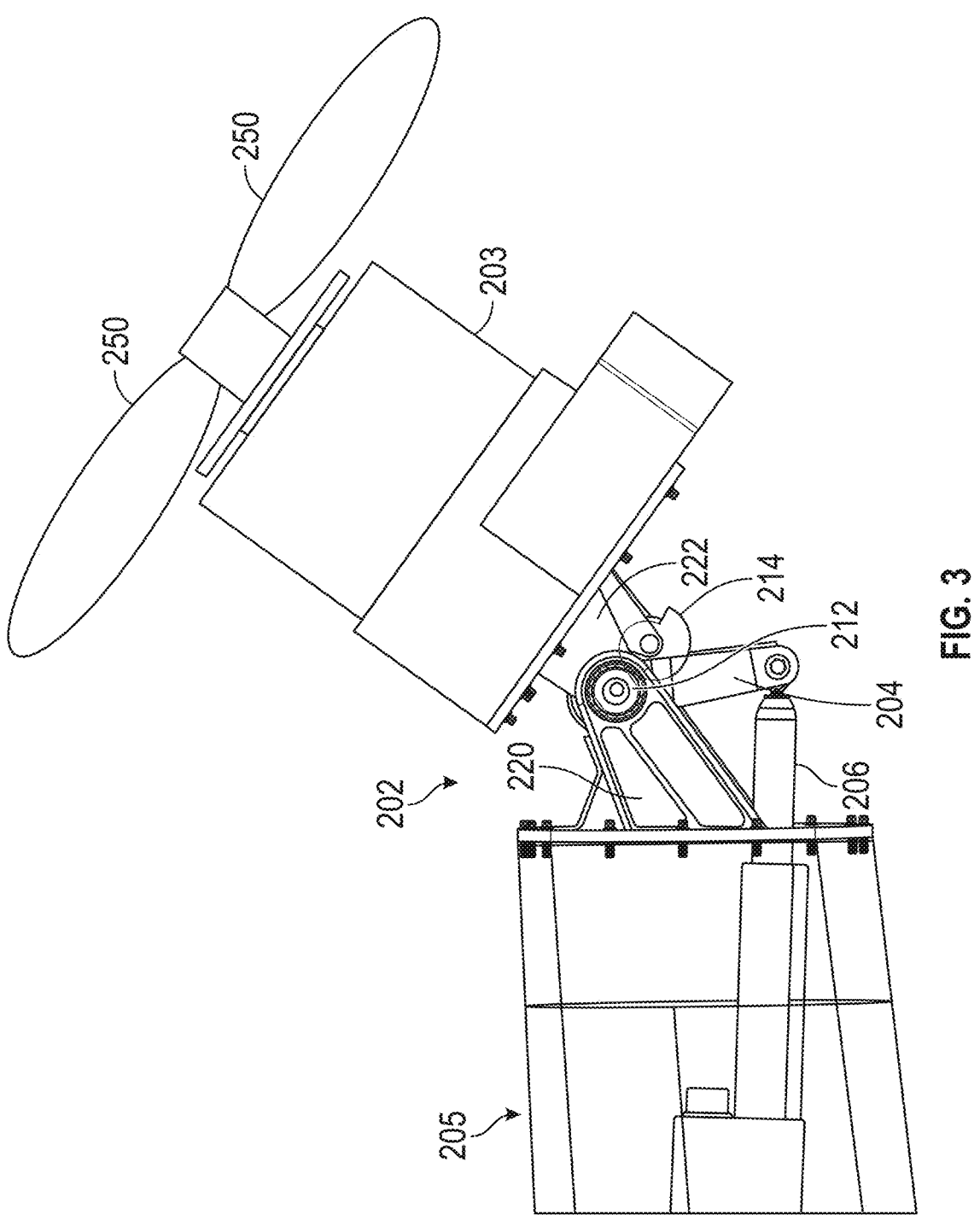
FIG. 3 shows a side view of a portion of an aircraft with an exemplary system, according to one or more examples of the disclosure.

FIG. 3 illustrates an exemplary system 202 for coupling tilting a proprotor with adjusting the pitch angle of blades of the proprotor. The system 202 is configured such that the pitch angle of the blades of the proprotor can correspond with the tilt position of the proprotor without requiring independent systems for tilting the proprotor and adjusting the pitch angle of the blades. Accordingly, the system 202 reduces the complexity and cost of the aircraft.

The system 202 rotatably couples a proprotor 203 to a boom 205 of an aircraft, proprotor 114 to boom 122 of aircraft 100. The system 202 can include a fixed frame 220 for mounting to the aircraft (e.g., the proprotor 203 can be connected to a boom 205 via a bracket 236 of the fixed frame 220) and a proprotor frame 222 to which the proprotor 203 mounts. The proprotor frame 222 can be tiltably connected to the fixed frame 220 at a joint 212.

The system 202 can include one or more arm(s) 204 connected to the proprotor frame 222. A linear actuator 206 can be connected to the arm(s) 204 tilt the proprotor 203 about the joint 213. The actuator 206 can be, for example, a ball screw actuator or a pneumatic actuator. Alternatively, rotary actuator, such as a stepper motor or a servomotor, can be mounted at the joint or can drive a gear train that has an output gear located at the joint or engaged with a gear located at the joint.

The system 202 can include a cam 214 that can rotate in correspondence with tilting of the proprotor 203. A control rod (discussed further below) can be operatively coupled with the cam 214 such that the control rod can translate when the cam 214 rotates. The control rod is coupled at its opposite end to the blades 250 of the proprotor 203 such that translation of the control rod adjusts the pitch angle of the blades 250 of the proprotor 203. Accordingly, the system 202 couples the pitch angle of the blades 250 of the proprotor 203 to the tilt of the proprotor 203. During operation, a control system of the aircraft can send a proprotor tilt adjustment command to the actuator 206. The actuator 206 may extend or retracted, causing the proprotor to increase or decrease its degree of tilt. As the proprotor tilt changes, the cam 214 rotates. This, in turn, can cause the control rod to translate, which adjusts the pitch of the blades 250.

Figure 4:
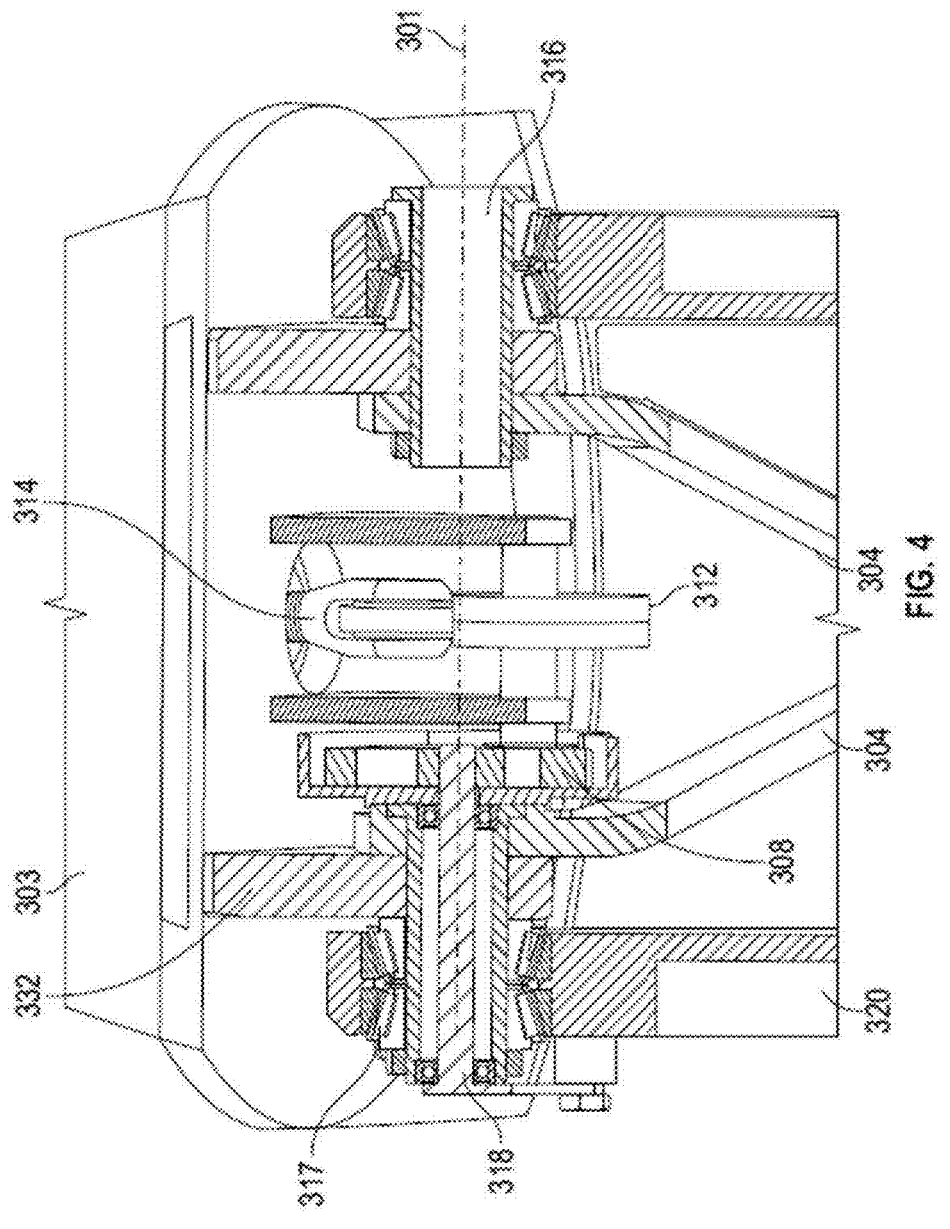
FIG. 4 shows a detail view of an exemplary system, according to one or more examples of the disclosure.

FIG. 4 shows a detail view of an exemplary system 302 for mechanically linking tilting a proprotor of an aircraft between a vertical thrust position and a forward thrust position with adjusting the pitch angle of blades of the proprotor. The system 302 can be used for system 202 of FIG. 3. The system 302 can include a fixed frame 320 for mounting to a portion of a VTOL aircraft (such as to the fuselage, wing, or a boom structure), and a proprotor frame 322 for mounting the proprotor 303 that is rotatably mounted to the fixed frame 320 at a rotation axis 301. In one or more examples, the system 302 includes a gear 308, a pinion (not shown in figure), a cam 312, a control rod 314, and a pair of arms 304.

As shown in FIG. 4, the gear 308 is located along the rotation axis 301. The gear 308 can be fixed in position relative to the fixed frame 320. For instance, as shown in FIG. 4, the gear 308 is connected to an internal pin 318 that attaches to the fixed frame 320. One or more of the shafts 316 can surround an internal pin 318, which is shown clearly by the cutaway view of the left shaft 316 of FIG. 4. A set of bearings 317 is located between each shaft 316 and the fixed frame 320 such that the shafts 316 are rotatably mounted to the fixed frame 320.

The proximal end of the arms 304 can engage with the proprotor frame 322. The engagement between the arms 304 and the proprotor frame 322 can be a fixed connection, such as by bolting or welding the arms 304 to the proprotor frame 322. Optionally, both the arms 304 and the proprotor frame 322 can be fixedly connected to the shafts 316. The distal end of the arms 304 can connect to one or more actuators 306 (see FIG. 5) that drive the arms 304 to rotate about the rotation axis 301. As the actuator 306 drives the arms 304, the proprotor 303 is rotated about the rotation axis 301.

Figure 5:
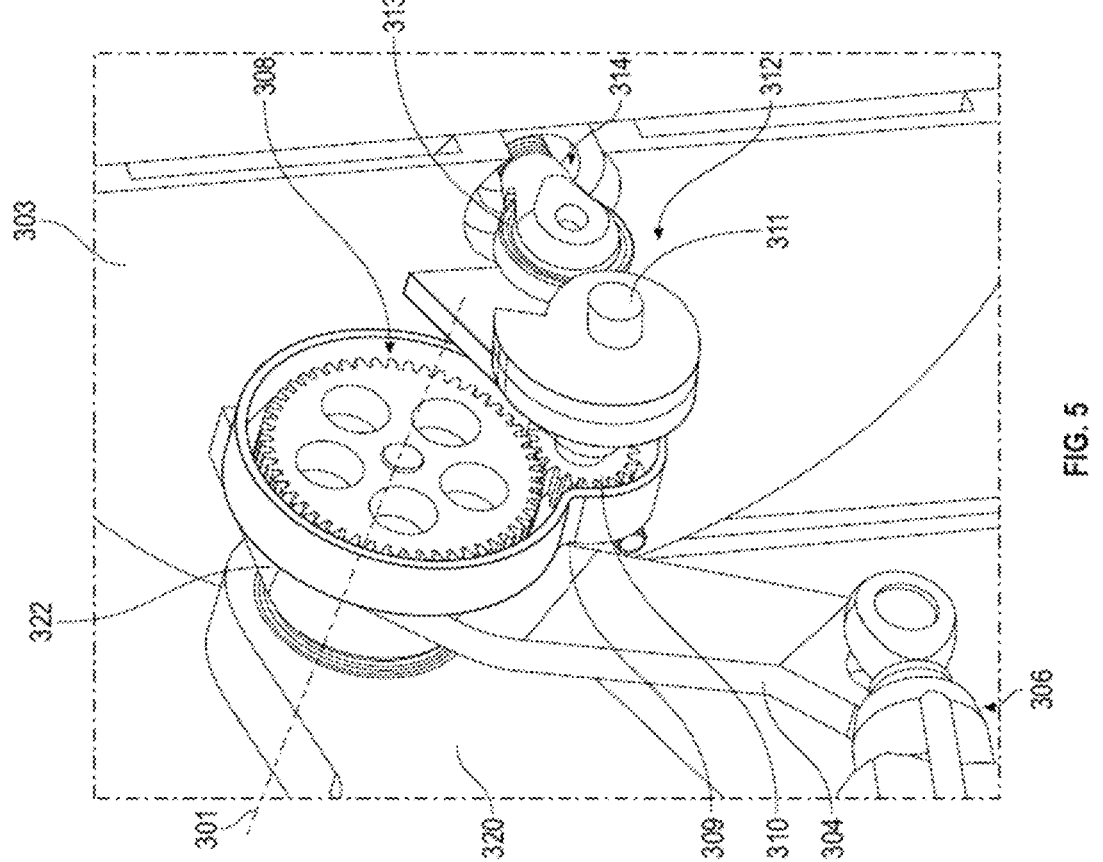
FIG. 5 shows a detail view of a portion of the exemplary system of FIG. 4, according to one or more examples of the disclosure.

The engagement between the gear 308, pinion, cam 312 and control rod 314 is shown more clearly in FIG. 5, which shows a detail view of a portion of the exemplary system 302 of FIG. 4. The pinion 310 is mounted within pinion housing 309, which is coupled in a fixed position to the arm 304 and/or the proprotor frame 322. Accordingly, the pinion 310 is rotationally coupled to the proprotor frame 322 such that the pinion 310 moves with the proprotor frame 322

(e.g., as the proprotor frame 322 and proprotor 303 rotate about the rotation axis 301). The pinion 310 is also engaged with the gear 308. Rotation of the pinion housing 309 drives the pinion 310 around at least a portion of the gear 308, which causes the pinion 310 to rotate via the toothed engagement with the gear 308.

The cam 312 is fixedly connected to the pinion 310, such as via the internal pin 311, such that the cam 312 rotates with the pinion 310. The cam 312 is also operatively coupled to a first end of the control rod 314, such that the control rod 314 translates relative to the internal pin 311 during at least a portion of the rotation of the cam 312. The control rod 314 is coupled at a second end to the blades of the proprotor (as will be described below) such that translation of the control rod 314 adjusts the pitch angle of the blades.

As the proprotor frame 322 rotates about the rotation axis 301 (e.g., to tilt the proprotor 303), the pinion 310 revolves around the gear 308, which rotates the cam 312 and translates the control rod 314, thereby adjusting the pitch angle of the blades of the proprotor 303. Accordingly, the system 302 mechanically links tilting the proprotor 303 with adjusting the pitch angle of the blades of the proprotor 303.

The control rod 314 can be engaged with the cam 312 via a follower that follows the cam 312 as the cam 312 rotates. The follower can be, for example, a roller or a pin. As shown in FIG. 5, the control rod 314 engages the cam 312 via a roller 313. The roller 313 travels along the outer surface of the cam 312 as the cam 312 rotates. To remain engaged with the outer surface of the cam 312, the control rod 314 can be biased in compression against the cam 312, such as via a spring (not shown in figure).

The cam profile (e.g., shape of its outer surface that the control rod follows) controls the position of the control rod. The profile of the cam 312 can include one or more portions that cause translation of the control rod 314 and can include one or more portions do not cause the control rod 314 to translate. For example, the cam 312 can have one or more spiral portions that cause translation of the control rod 314 and/or one or more circular portions that do not cause the control rod 314 to translate. In the example shown in FIG. 5, the cam 312 includes a spiral profile that will cause the control rod 314 to continuously translate throughout the range of tilt of the proprotor.

Figure 6:
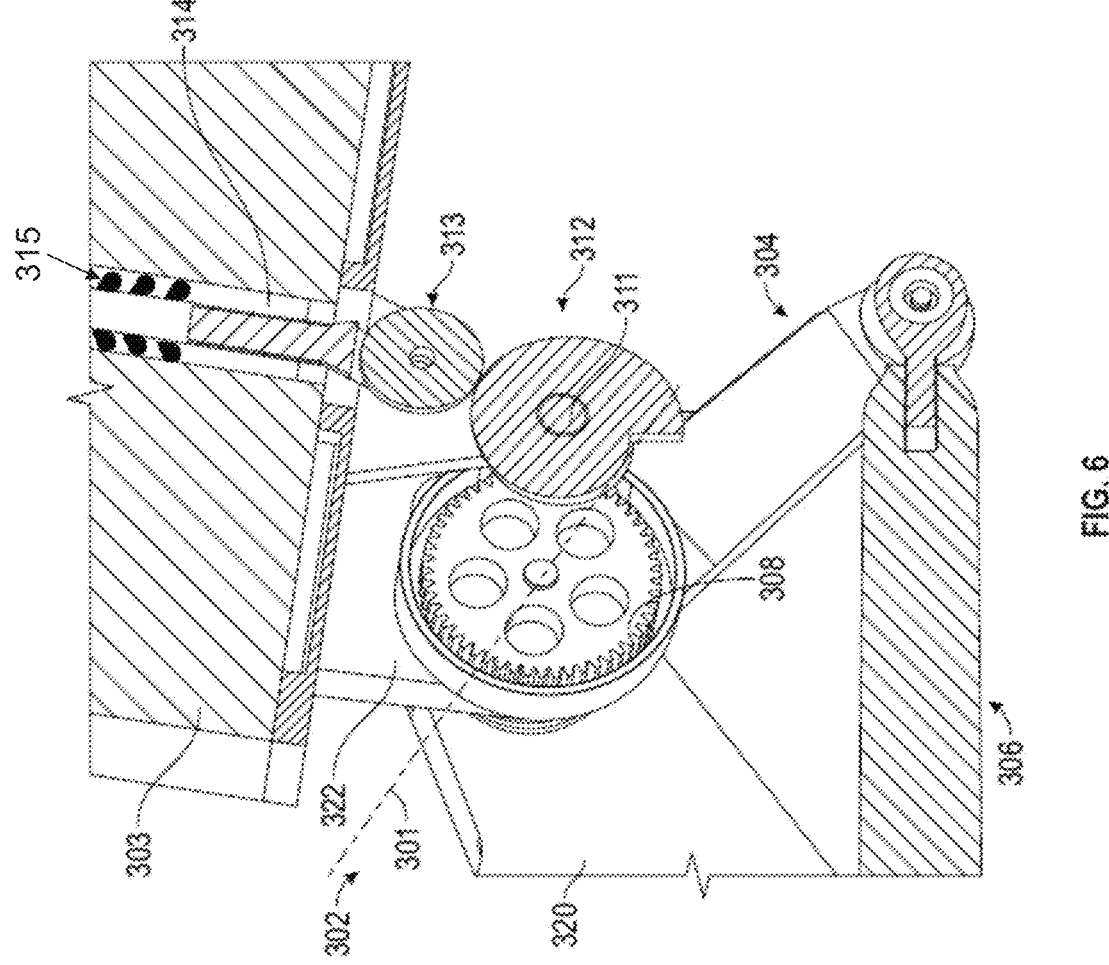
FIG. 6 shows another detail view of a portion of the exemplary system of FIG. 4, according to one or more examples of the disclosure.

FIG. 6 shows another detail view of a portion of the exemplary system 302 of FIGS. 4 and 5. Whereas FIG. 5 depicts the control rod 314 engaged with two sides of the outer surface of the cam 312 (e.g., in the corner area of the snail-shaped cam), FIG. 6 depicts the control rod 314 engaged with only one side of the outer surface of the cam 312. The position of the control rod 314 depicted in FIG. 6 compared to that of the control rod of FIG. 5 can be obtained by rotating the cam 312 in a clockwise direction such that the roller 313 moves in a counterclockwise direction as it follows the surface of the cam 312.

As the roller 313 follows the spiral portion of the cam 312, the control rod 314 may translate toward or away from the internal pin 311 at the center of the cam 312. For instance, if the cam 312 rotates in a clockwise direction, as the roller 313 follows the spiral portion of the cam 312, the control rod 314 translates away from the internal pin 311. Opposite, if the cam 312 rotates in a counter-clockwise direction, the control rod 314 can translate towards the internal pin 311 as the roller 313 follows the spiral portion of the cam 312. As the roller 313 follows the circular portion of the cam 312, the control rod 314 may remain at a constant distance and not translate relative to the internal pin 311. For example, the cam 312 can include a spiral profile for the first 210 degrees of rotation, with a circular profile for the remaining 150 degrees of rotation, such that the control rod 314 only translates away from the internal pin 311 during the first 210 degrees of rotation of the cam 312. As noted above, the control rod 314 can be biased in compression against the cam 312 via a spring 315.

Figure 7:
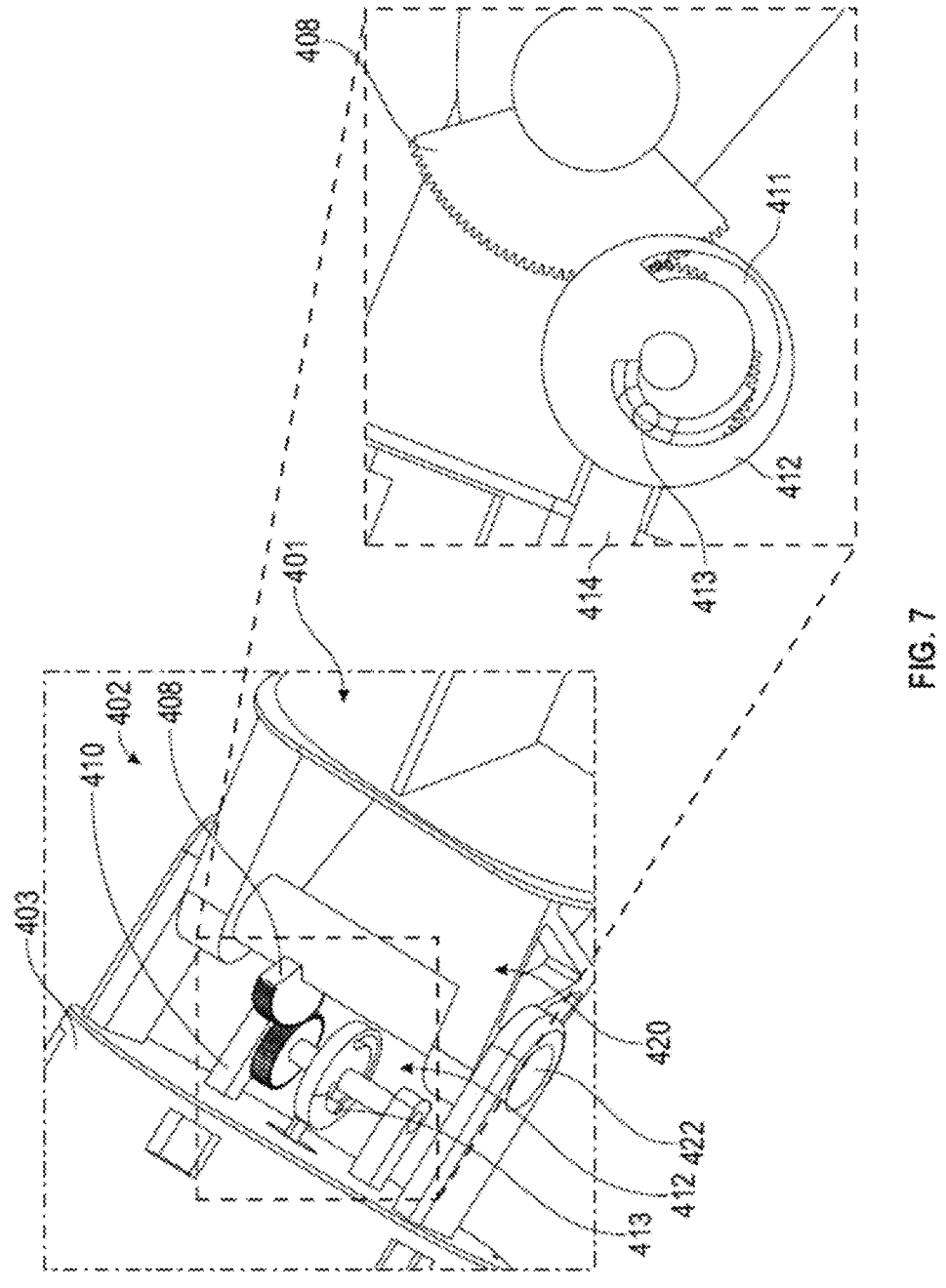
FIG. 7 shows a top perspective view and a detail view of an exemplary system, according to one or more examples of the disclosure.

FIG. 6 shows an example where the control rod 314 has a roller 313 engaged with an outer surface of the cam 312. Alternate configurations may have a different engagement between the control rod and cam. For instance, FIG. 7 shows a top perspective view of an exemplary system 402 that includes a control rod 414 with a pin 413 engaged with a track 411 of a cam 412. The pin 413 engages the track 411 of the cam 412 such that the cam 412 can both push and pull the pin 413 and the control rod as the cam 412 rotates.

The system 402 can be used for system 202 of FIG. 3. Similar to the systems discussed above, the system 402 connects a proprotor 403 to a portion of an aircraft (to a boom 401 as shown in FIG. 7). Distinct from the systems above, however, the system 402 includes a control rod 414 with a pin 413 that rides in a track. This configuration is more clearly visible the detailed pop-out of the cam 412, which shows the pin 413 of the control rod 414 engage with the track 411 in the cam 412. As the cam 412 rotates, such as by engagement with the pinion 410 rotating as it revolves around the gear 408, the pin 413 can follow the track 411, thereby translating the control rod 414.

The gear 408 can be fixed in position relative to the fixed frame 420, which is fixedly mounted to the aircraft. For instance, as shown in FIG. 7, the gear 408 is connected to the fixed frame 420. The pinion 410 can be rotatably mounted to the fixed frame 420, such that the pinion 410 is rotationally coupled to the proprotor frame 422 and moves with the proprotor frame 422.

The track 411 can include a spiral portion and a circular portion. As the pin 413 follows spiral portion of the track 411, the control rod 414 can translate toward or away from a center of the cam 412. As the pin 413 follows a circular section of the track 411, however, the control rod 414 can remain at a constant distance and not translate relative to the center of the cam 412. Optionally, the track 411 of the cam 412 can be a variety of geometries, based on the type of translation desired. To remain engaged with the track 411, the control rod 414 can be biased in compression or tension against the cam 312, such as via a spring (not shown in figure).

Figure 8:
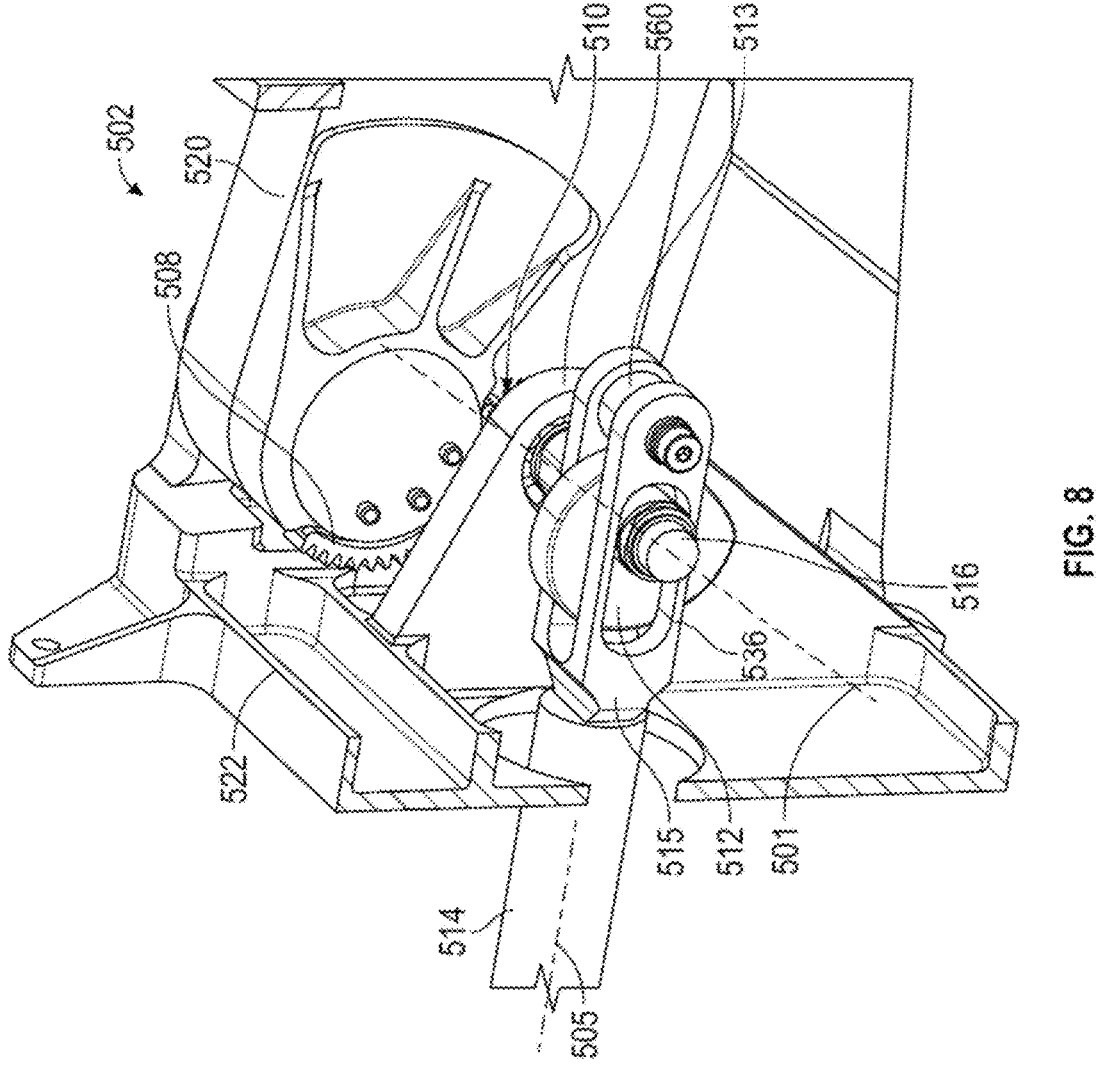
FIG. 8 shows a detail view of an exemplary system with a control rod in tension, according to one or more examples of the disclosure.

Another exemplary cam-control rod configuration is shown in FIG. 8. Unlike system 302, in system 502 the control rod 514 is held in tension. Similar to the systems described above, the system 502 can include a proprotor frame 522 rotatably mounted to a fixed frame 520 that is mounted to a portion of the aircraft (such as to the fuselage, wing, or a boom structure). The system 502 can be configured such that one or more actuators (not shown in figure) drive the proprotor frame 522 to rotate about the rotation axis 501 to tilt a proprotor mounted to the proprotor frame 522 between a vertical thrust position and a forward thrust position.

Similar to the systems described above, the system 502 includes a control rod 514 that engages a cam 512, which rotates based on an engagement with a pinion 510 engaged with a gear 508. The gear 508 can be fixed in position relative to the fixed frame 520. For instance, as shown in FIG. 7, the gear 508 is connected to the fixed frame 520. The cam 512 is fixedly connected to the pinion 510, such as via the shaft 516, so that the cam 512 rotates with the pinion 510. The pinion 510 can be rotatably mounted to the fixed frame 520, such as via a bearing mounting to rib 560, such that the pinion 510 is rotationally coupled to the proprotor frame 522 and moves with the proprotor frame 522. The pinion 510 revolves around the gear 508 as the proprotor frame 522 moves, which rotates the cam 512.

The control rod 514 includes a clevis 515 and a follower 513, which is a roller in this example. As shown, the cam 512 is engaged with the follower 513 such that the follower 513 rolls along the cam 512 as it rotates. The follower 513 is rotatably attached to the clevis 515 of the control rod 514. The control rod 514 is in tension (a force is applied—such as via one or more springs—along axis 514 to the left in the view of FIG. 8) such that the follower 513 is forced against the cam 512. Thus, as the follower 513 rolls along the cam 512, the control rod 514 may translate along axis 505 (depending on the profile of the cam 512). As above, the cam 512 can have any suitable profile that for achieving the desired relationship between blade pitch and proprotor tilt.

Figure 9:
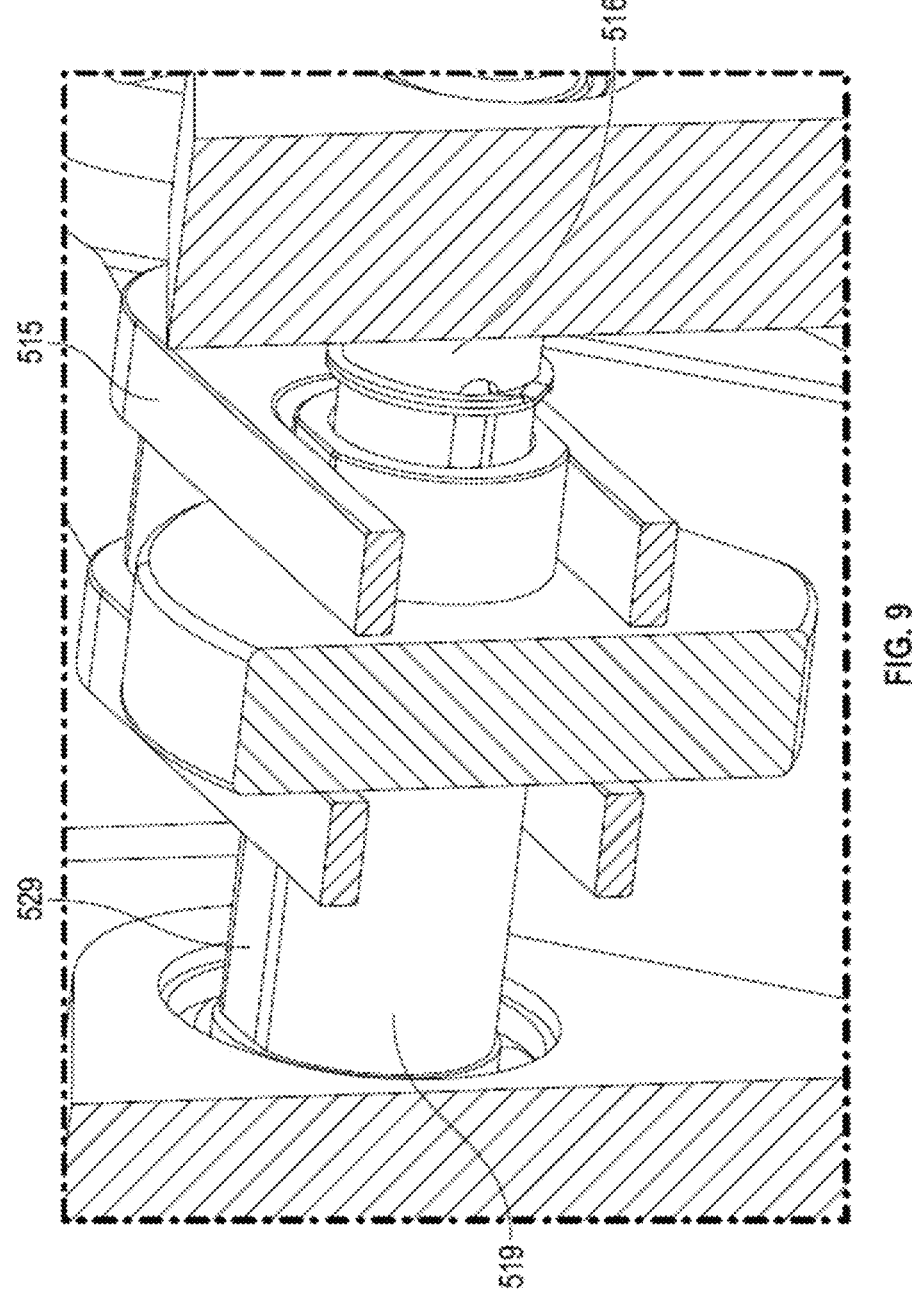
FIG. 9 shows a detail cutaway view of the bushing and cam interface of the exemplary system of FIG. 8, according to one or more examples of the disclosure.

The clevis 515 includes a slot 536 that through which the shaft 516 may extend. The clevis 515 is separated from the shaft 516 by a bushing, which is shown more clearly in FIG. 9, which shows a detail cutaway view of the bushing 519 and clevis 515 interface of the system 502 of FIG. 8. The bushing 519 can include engagement surfaces 529 on the areas of the bushing 519 that engage with the clevis 515, with the engagement surfaces 529 shaped such that the clevis 515 is prevented from rotating, which in turn prevents the control rod attached to the clevis 515 (e.g., the control rod 514 shown in FIG. 8) from rotating. As shown in FIG. 9, the engagement surfaces 529 of the bushings 519 are flat, which corresponds to flat surfaces of the clevis 515. Optionally, these surfaces may be another shape, based on the shape of corresponding surfaces of the clevis 515. For example, the engagement between the clevis 515 and the bushings 519 may involve circular, elliptical, or angled surfaces.

Figure 10:
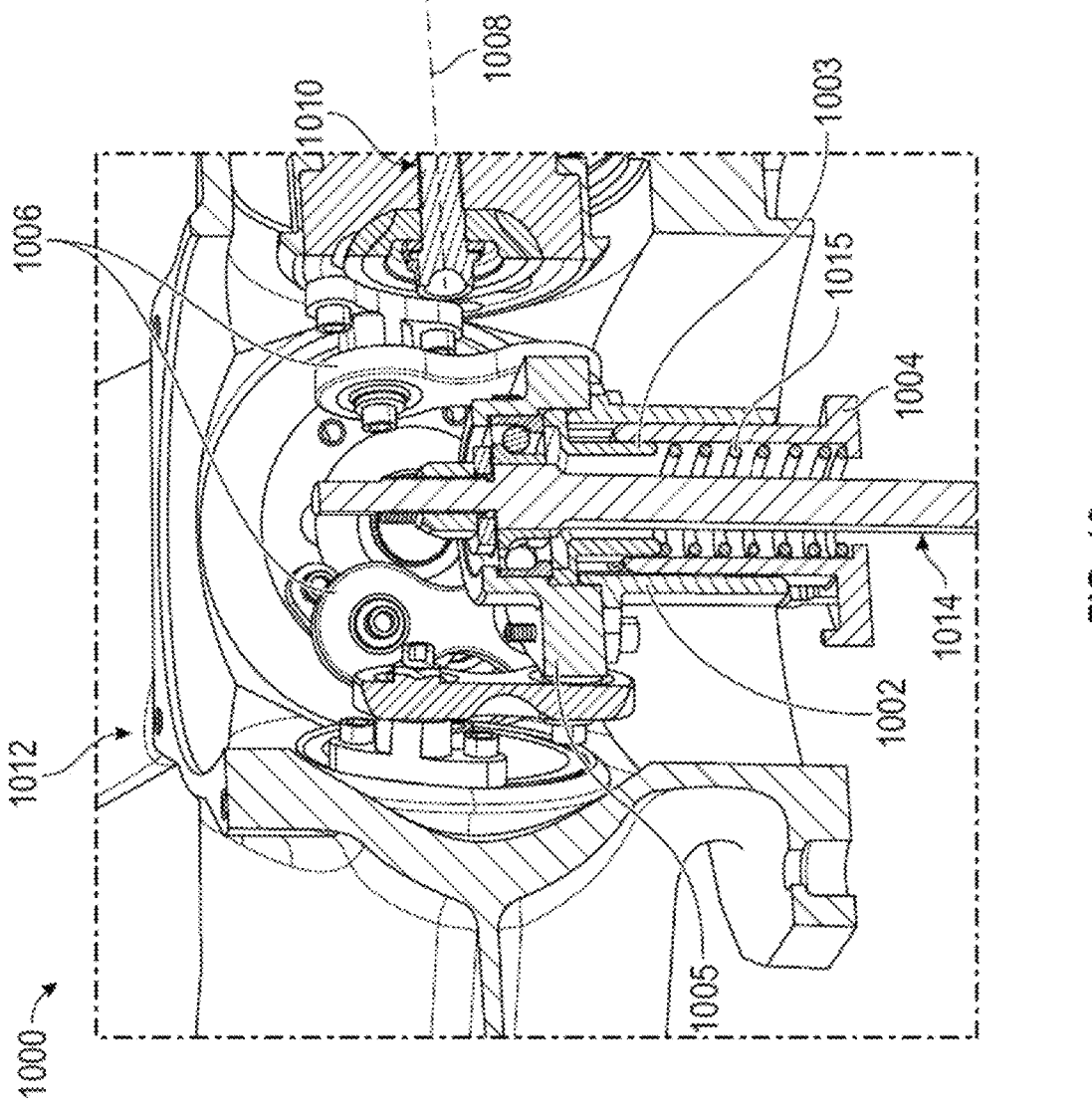
FIG. 10 shows a cutaway detail view of an exemplary hub of a proprotor, according to one or more examples of the disclosure.

As discussed above, translation of the control rod of any of the above exemplary systems can adjust the pitch angle of the blades of the proprotor. The control rod can be operatively engaged with a plurality of blades such that translation of the control rod causes rotation of the blades. FIG. 10 shows a cutaway detail view of an exemplary hub 1000 of a proprotor, showing an example of the coupling of a control rod 1014 with the blades 1012 of the proprotor, according to one or more examples of the disclosure. The hub 1000 can include an engine shaft 1004, a spring 1015, a bearing 1003, a plate 1002, a pitch plate 1005 and a number of links 1006. The blades 1012 are mounted to the hub 1000. For instance, each blade 1012 can include blade roots 1010 that connect to the links 1006. The control rod 1014 connects to the pitch plate 1005 and/or the plate 1002 of the hub 1000. The other end of the control rod 1014 can connect to a system configured to translate the control rod 1014 while tilting a proprotor, as discussed above.

The engine shaft 1004 surrounds the spring 1015 and the bearing 1003 and connects to the plate 1002 that connects to the pitch plate 1005 engaged with the links 1006. The engine shaft 1004 connects to the engine (not shown in figure) of the hub 1000. The plate 1002 is constrained in rotation by a spline interface to the engine shaft 1004 such that the plate 1002 rotates with the engine shaft 1004. The control rod 1014 is prevented from rotating along with the plate 1002 via the bearing 1003. The pitch plate 1005 connects to the blade roots 1010 via links 1006. As shown in FIG. 10, the links 1006 are dog-bone links, however other linkage types are contemplated, such as pitch links, etc. The spring 1015 can maintain the control rod 1014 in tension or compression.

In the example of FIG. 10, the spring 1015 maintains the control rod 1014 in tension by pressing the control rod 1014 against the pitch plate 1005.

As the control rod 1014 translates (e.g. advances or retracts axially), the plate 1002 and/or pitch plate 1005 translates, which causes the links 1006 to adjust the pitch angle of the blades 1012 by rotating each blade 1012 about a central axis 1008 of the blade 1012. Rotating each blade 1012 about the central axis 1008 adjusts the pitch angle of the blades 1012. Accordingly, translation of the control rod 1014 can adjust the pitch angle of the blades 1012 of the proprotor.

Figure 11:
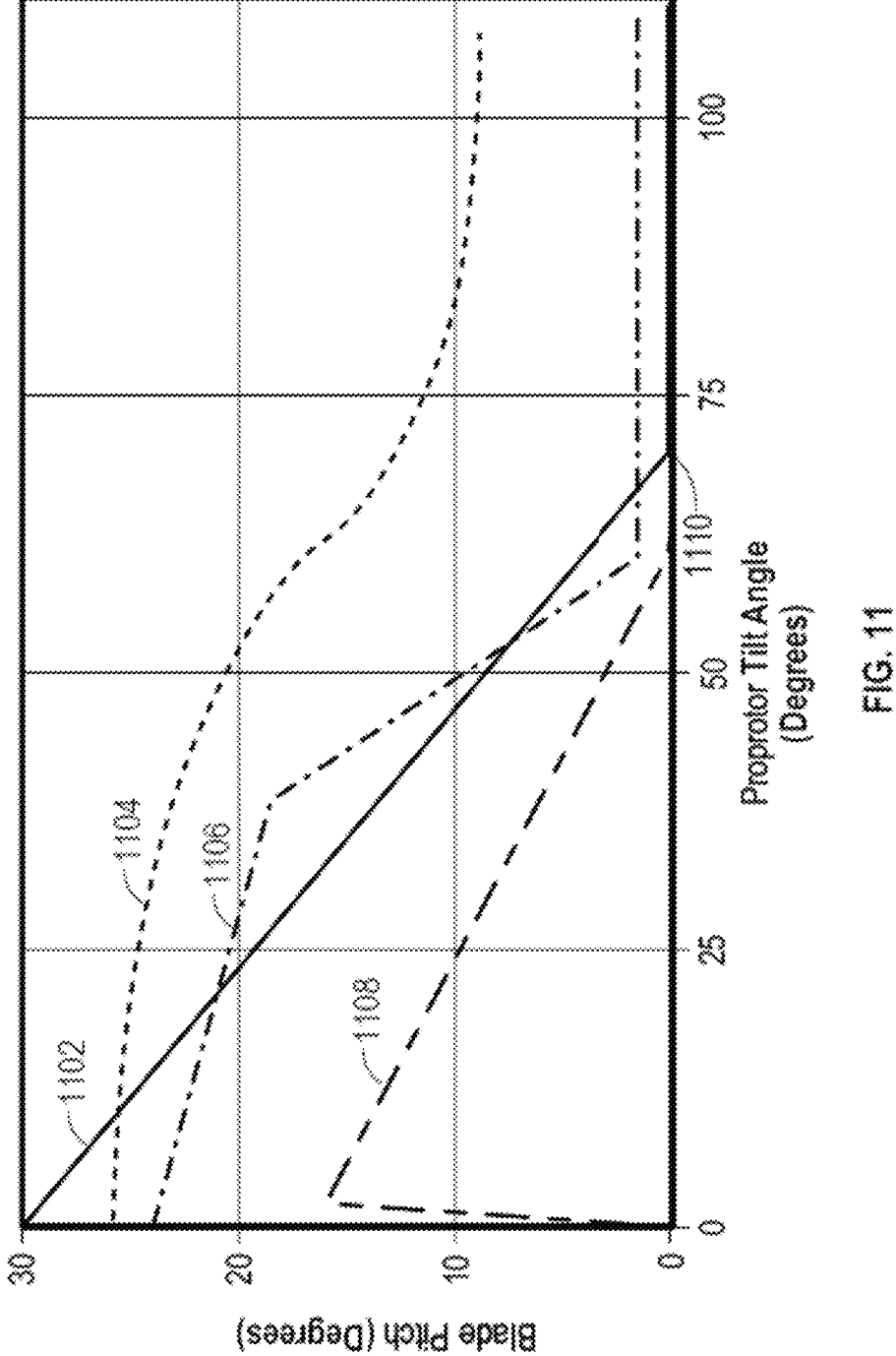
FIG. 11 shows a graph of examples of blade pitch as a function of proprotor tilt angle.

As discussed above, adjusting the pitch of the blades of a proprotor based on the tilt of the proprotor can enable the propeller operational characteristics to be tuned to the different stages of flight, which can lead to greater efficiency that can result in less energy demand over the course of the flight. The relationship between blade pitch and proprotor tilt can be selected by selecting the desired cam profile (e.g., the profile of cam 214). A wide variety of relationships between blade pitch and proprotor tilt are achievable based on the selection of the cam profile. FIG. 11 is a graph that shows examples of some of these relationships.

The graph of FIG. 11 shows blade pitch as a function of proprotor tilt angle. The proprotor tilt angle, which is provided on the X-axis of the graph of FIG. 11, is the angle of the rotational axis of the proprotor relative to a line that extends parallel to a longitudinal axis of the aircraft and intersects the rotational axis of the proprotor. The rotational axis of the proprotor is shown in the example of FIG. 2, as rotational axis 1101-A when the proprotor is in a forward flight position (rotational axis 1101-A is coincident with the line that extends parallel to the longitudinal axis 1103 of the aircraft and intersects the rotational axis of the proprotor) and rotational axis 1101-B when the proprotor is in a lift position. Zero degrees of tilt angle on the graph of FIG. 11 corresponds to the proprotor having a rotational axe that is parallel to the longitudinal axis 1103 of the aircraft—e.g., for providing forward thrust for forward flight, and ninety degrees of tilt angle corresponds to the proprotors providing vertical thrust, such as for vertical take-off and landing.

Figure 12:
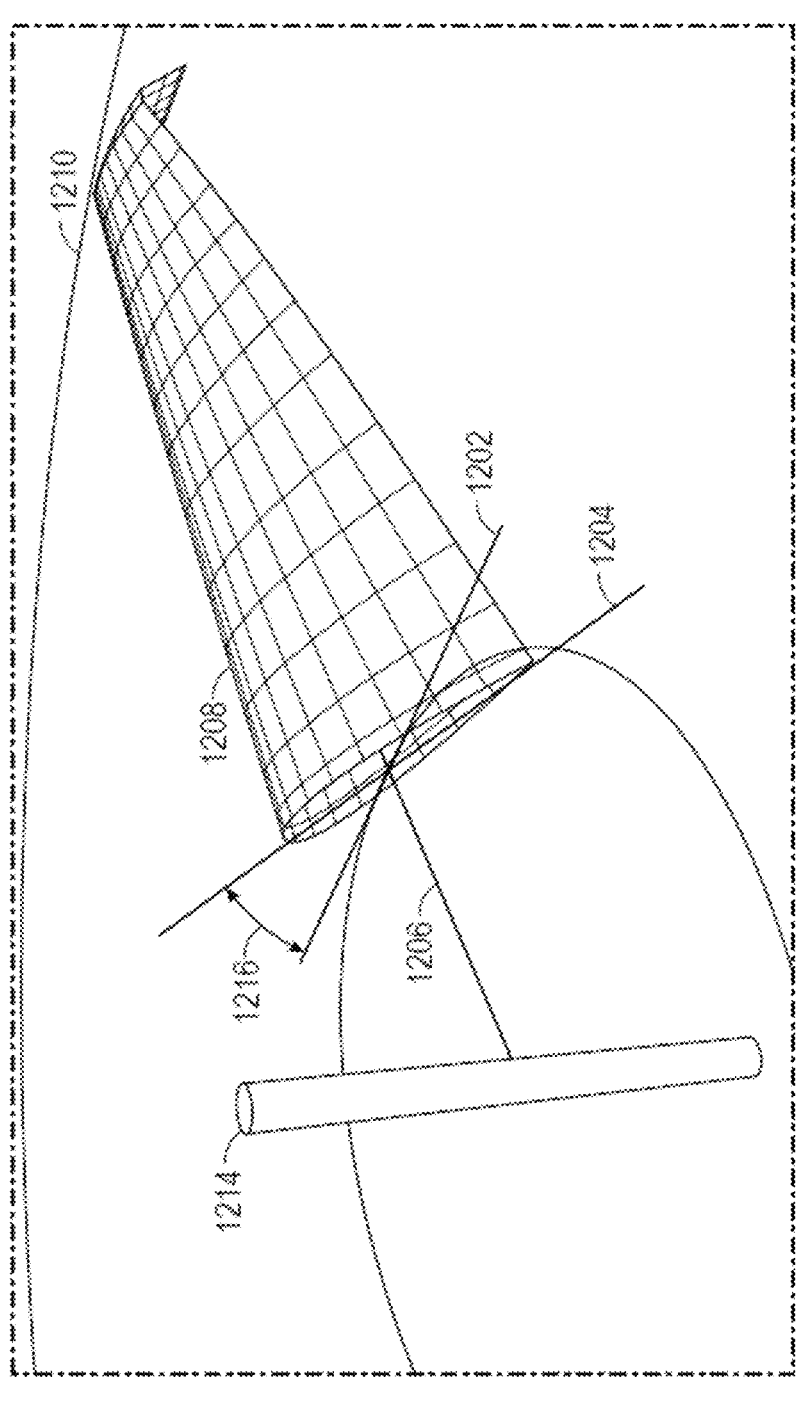
FIG. 12 is a diagram illustrating blade pitch angle.

The pitch of the blades, which is provided on the Y-axis of the graph of FIG. 11, can be defined as the angle between the chord of the blade and the plane of rotation and may be measured at a specific point along the length of the blade. FIG. 12 is a diagram showing an example of the definition of blade pitch. The blade 1208 (only one is shown for simplicity but it will be understood that each proprotor will include multiple blades) revolves about proprotor rotational shaft 1214 and is mounted such that it can rotate about a pitch axis 1206, enabling the pitch 1216 of the blade 1208 to be adjusted. The plane that contains the pitch axis 1206 and is traversed by the blade 1208 when the blade 1208 rotates can be referred to as the disc plane 1210. The pitch 1216 of the blade 1208 can be defined as the angle between the chord 1204 of the blade 1208 (a line joining the leading edge and trailing edge of the blade 1208) and a line 1202 lying within disc plane 1202 that is perpendicular to the pitch axis 1206. The pitch values shown in FIG. 11 are merely exemplary and it will be understood by a person of ordinary skill in the art that the pitch values will depend on the specific design of the blades and the location along the blades where the pitch is measured. Similarly, the proprotor tilt values shown in FIG. 11 are merely exemplary and it will be understood by a person of ordinary skill in the art that a different range of proprotor tilt could be used, including a negative tilt angle associated with the proprotor being tilted somewhat downwardly.

FIG. 11 includes four different lines 1102-1108 indicating four different relationships between blade pitch and proprotor tilt. Each line is associated with a different cam profile. Lines 1102, 1104, and 1106 have maximum blade pitches (maximums for the given line) at a zero proprotor tilt angle. This can be the blade pitch for forward flight in which the higher blade pitch can provide better efficiency at the relatively high airspeeds of forward flight.

Line 1108 has a very low blade pitch at zero proprotor tilt. This could result in the blades creating a relatively high drag at high airspeeds, which can be useful to slow down the aircraft, such as for landing. This low blade pitch may also be useful for increasing the efficiency of the proprotor at low airspeeds, such as during a conventional (airplane style) take-off. The blade pitch quickly increases to a maximum so that the proprotor need only be tilted a relatively small amount to achieve the maximum blade pitch, which may be a desirable blade pitch for forward flight. With this relationship, the proprotor need only be tilted a small amount relative to the minimum tilt (e.g., zero tilt as shown, a small positive tilt, a small negative tilt, etc.) to achieve a more optimal blade pitch for the high speeds of forward flight.

Each line 1102-1108 shows the blade pitch decreasing to a minimum blade pitch (minimum for the given relationship) that is associated with a maximum proprotor tilt-tilt that may be used for vertical flight and hover. The minimum blade pitch can be optimal for the low air speed and high thrust requirements of vertical flight and hover. Lines 1104 and 1106 demonstrate that the minimum blade pitch need not be zero. The particular proprotor tilt angle at which the blade pitch minimum is reached can be selected based on the cam profile, as demonstrated by the different locations of this point for the various relationships (e.g., point 1110).

Each relationship 1102-1108 is achieved by a different cam profile. Cam profiles can include multiple regions having different shaped to achieve the changes in relationship between the blade pitch and proprotor tilt of the various lines 1102-1108. For example, line 1102 can be achieved by a cam profile that includes a spiral section that corresponds to the range of zero degrees proprotor tilt to the proprotor tilt angle of point 1110. The spiral section (continuously changing radius) transitions to a circular section (constant radius) that provides for the unchanging blade pitch associated with proprotor tilt angles past point 1110. Line 1106 can be achieved by a first spiral section, followed by a second spiral section that has a different rate of change of the radius than the first spiral section, followed by a circular section. Line 1104 can be achieved by a cam profile that has continuously varying rates of change of radius.

The relationships shown in FIG. 11 are merely examples illustrating that many different relationships can be achieved by the appropriate selection of the cam profile. A person of ordinary skill in the art will understand that the desired relationship between blade pitch and proprotor tilt can be achieved by the appropriate cam profile design.

Figure 13:
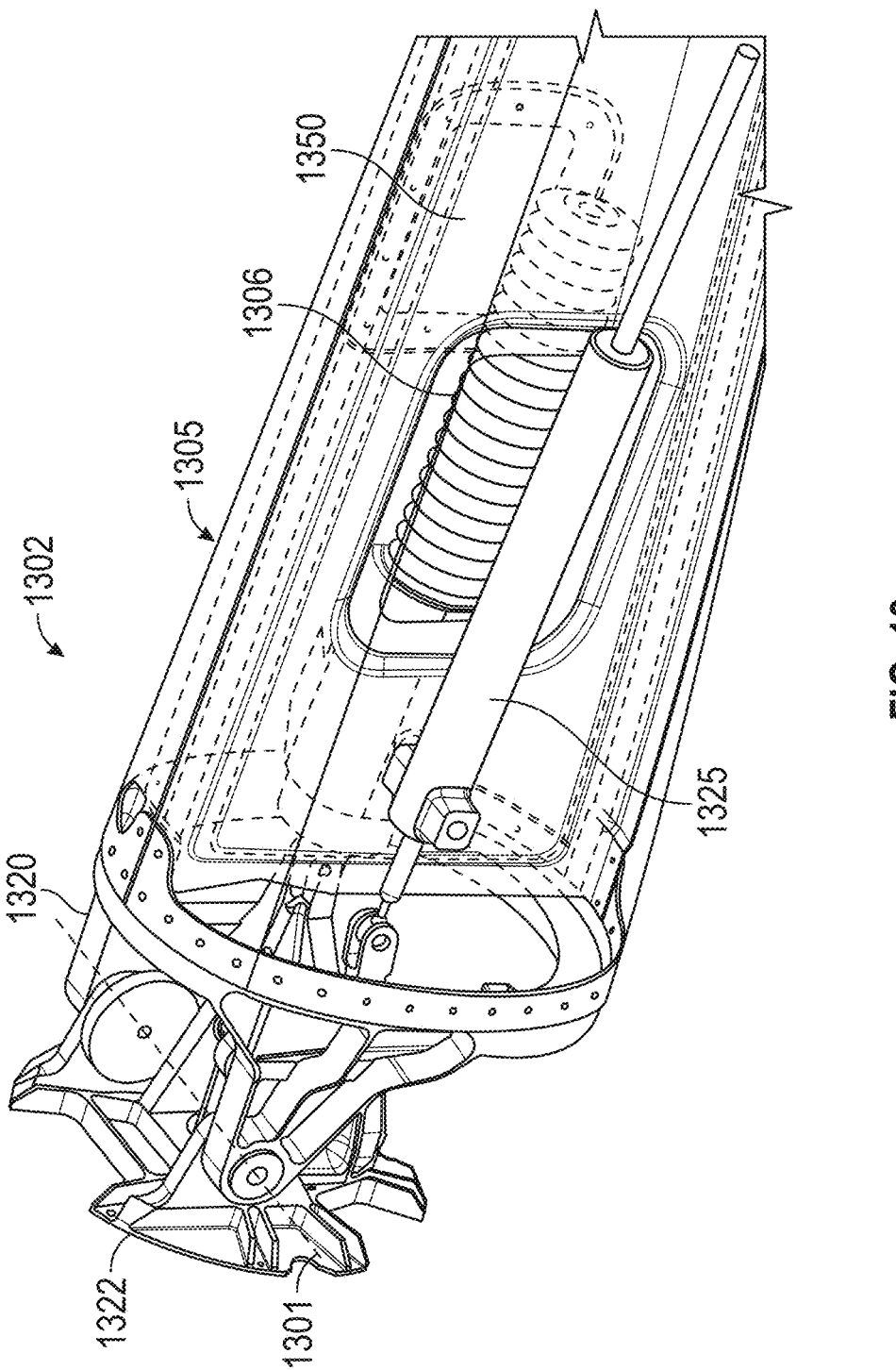
FIG. 13 shows a detail view of an exemplary system, according to one or more examples of the disclosure.

In one or more examples, any of the systems described above, such as system 202, system 302, system 402, system 502, and aircraft 100 can include a damper, as shown in the exemplary system 1302 of FIG. 13, for limiting a rate of tilt of the proprotor, such as in the event of actuator failure. The damper 1325 of system 1302 is connected between the boom 1305 of an aircraft, such as aircraft 100 of FIGS. 1 and 2, and the proprotor frame 1322, to which a proprotor (not shown) mounts. The damper 1325 can be housed within an outer shell of the boom 1305. In one or more examples, the boom 1305 can include a rib 1350, and the actuator 1306 and the damper 1325 can be positioned on opposite sides of the rib 1350. The proprotor frame 1322 is titltably connected to the fixed frame 1320 such that the proprotor frame 1322 (and the proprotor) can tilt about rotation axis 1301. The actuator 1306 is connected to the proprotor frame 1322 and drives the tilting of the proprotor about the rotation axis 1301.

Figure 14:
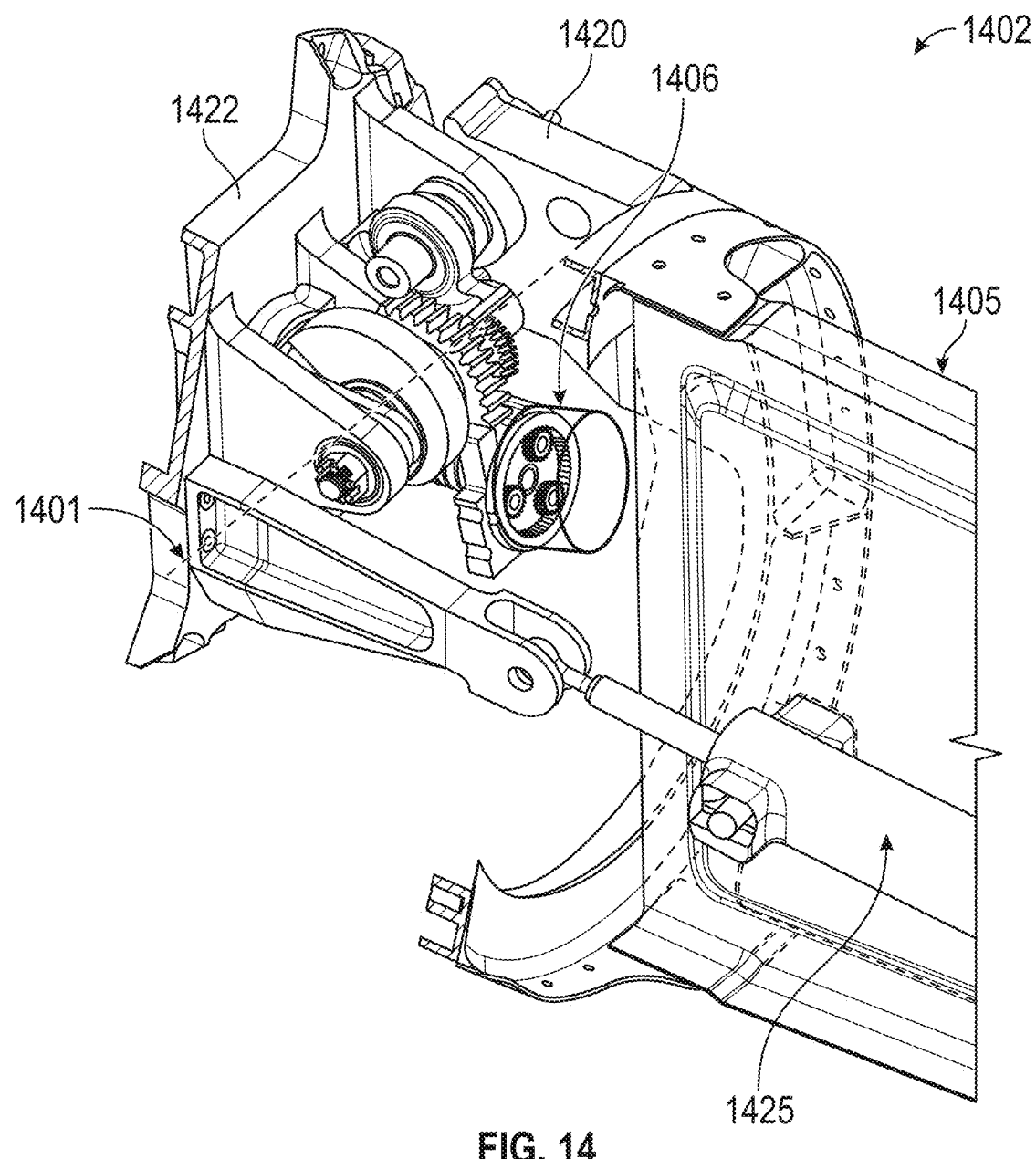
FIG. 14 shows a detail view of an exemplary system, according to one or more examples of the disclosure.

In one or more examples, the actuator 1305 can be a linear actuator. Alternatively, the actuator can be a rotary actuator, as shown in the exemplary system 1402 of FIG. 14. The system 1402 is otherwise similar to system 1302 of FIG. 13 in that it includes a damper 1425 connected between a boom 1405 of an aircraft and a proprotor frame 1422, which is tiltably connected to the fixed frame 1420 such that the proprotor frame 1422 (and the proprotor) can tilt about the rotation axis 1401. System 1402 includes a rotary actuator 1406 connected to the proprotor frame 1422 that drives the tilting of the proprotor about the rotation axis 1401. In the illustrated embodiment, the rotary actuator 1406 includes an electric motor connected to a gear train that drives a worm gear. The worm gear drives a gear to rotate about the rotation axis 1401, which tilts the proprotor.

If the actuator 1306 (or actuator 1406 of FIG. 14) were to become disconnected from the proprotor frame 1322, catastrophic failure may occur, as the proprotor could begin rapidly tilting without control. In one or more examples, the system 1302 could include a second (redundant) actuator that is also connected to the proprotor frame 1322 such that if the first actuator 1306 becomes disconnected, the second actuator can nonetheless control the tilting of the proprotor about the rotation axis 1301. However, adding a second actuator may complicate the system 1302, increase cost, and add more weight to the aircraft. Rather than implementing a second actuator, the system 1302 instead includes a damper mechanism such as damper 1325. In the event that the actuator 1306 becomes disconnected from the proprotor frame 1322, the damper 1325 dissipates energy and, thereby, limits the rate of change of tilt of the proprotor, which eliminates the catastrophic result of the actuator 1306 disconnecting from the proprotor frame 1322. The damper 1325 can include a balanced hydraulic or pneumatic cylinder, which as is known in the art includes a piston that slides within a cylinder, the piston including a plurality of apertures through which fluid flows as the piston moves within the cylinder. The damper 1325 is a passive damper configured to apply a force (a hydraulic or pneumatic force) to the proprotor frame 1322 (and proprotor) only when the tilt angle of the proprotor is being adjusted (i.e., no bias is applied when the proprotor is at rest). In one or more examples, the system 1302 may include one or more redundant actuators as well as a damper mechanism such as damper 1325.

The damper 1325 can be configured to limit the rate of change of the tilt angle of the proprotor frame 1322 in both tilt directions. The damper 1325 can be positioned such that a force vector of the damper 1325 can extend beneath the tilt axis, such as tilt axis 118 of FIG. 2. In one or more examples, the damper 1325 can be configured to limit the rate of change of the tilt angle of the proprotor to a predetermined threshold value in the event that the actuator 1305 becomes disconnected from the proprotor frame 1322.

Figure 15:
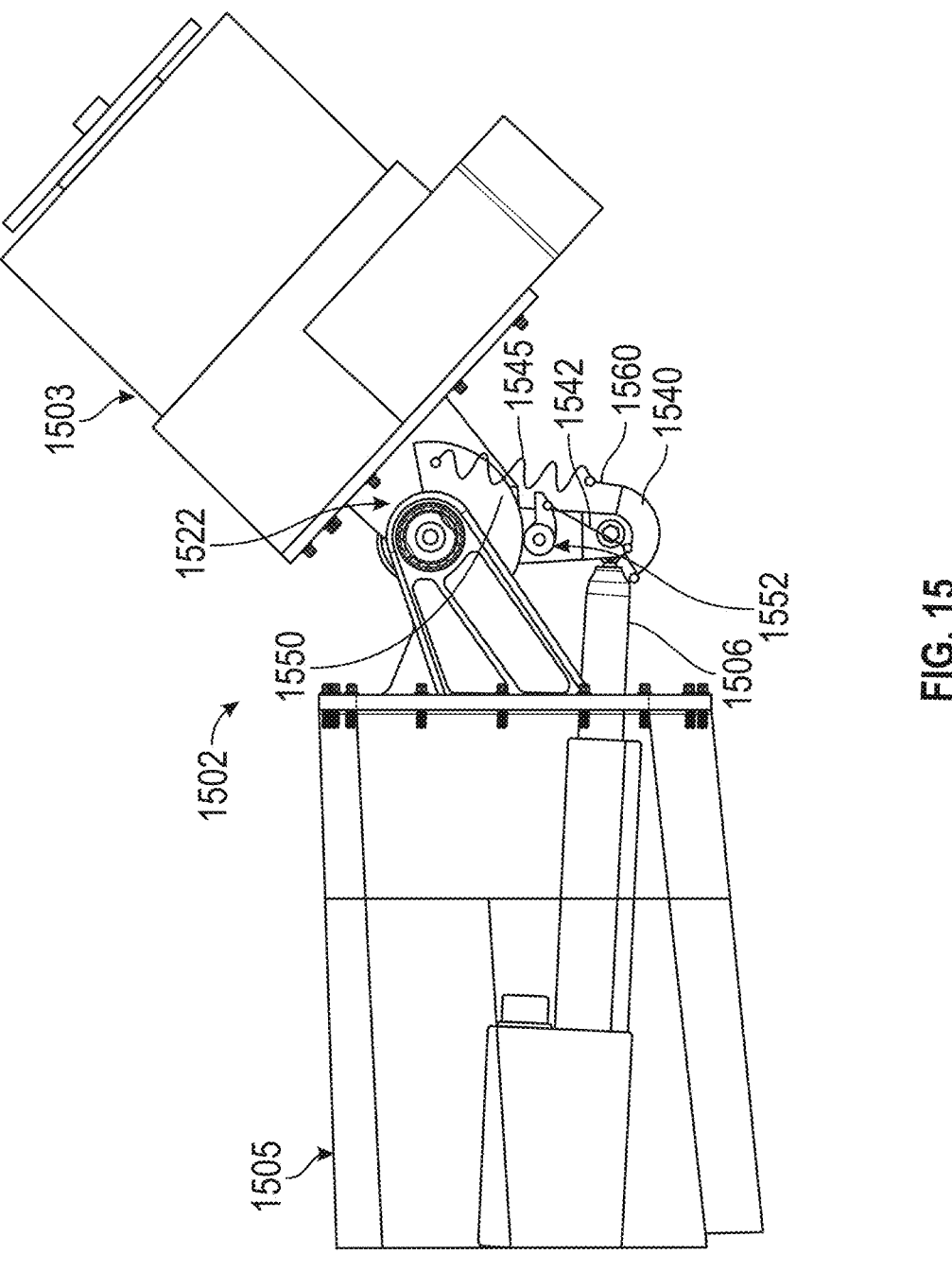
FIG. 15 shows a side view of an exemplary system in a first configuration, according to one or more examples of the disclosure.

In one or more examples, controlling an aircraft that includes one or more dampers, as discussed above can include receiving a command at a controller to adjust a tilt angle of a tiltable proprotor that is tiltable between a lift position for providing lift for the aircraft and a forward flight position for providing forward propulsion for the aircraft, and controlling at least one actuator to adjusting the tilt angle of the tiltable proprotor according to the command, wherein at least one passive damper is connected to the tiltable proprotor to limit a rate of change of the tilt angle of the tiltable proprotor In one or more examples, any of the systems described above, such as system 202, system 302, system 402, system 502, system 1302, system 1402, and aircraft 100 can include a tilt rotor lock mechanism, as shown in the exemplary system 1502 of FIG. 15, which shows a side view of the system 1502 in a first configuration, according to one or more examples of the disclosure. The system 1502 can be implemented in an aircraft with a tiltable proprotor instead of, or in addition to, redundant actuators and/or a damper mechanism, and can lock the tilt of the proprotor in place.

The system 1502 is positioned between a boom 1505 and proprotor 1503 of an aircraft, and can include a tension spring 1545 connected to a pulley 1540 via connector 1560, with the pulley 1540 also connected via connector 1542 to a pawl 1552. The pawl 1552 can be selectively engaged with a sector gear 1550 based on movement of the pulley 1540, with the pawl 1552 configured to move towards the sector gear 1550 as the pulley 1540 moves away from the actuator 1506. The pulley 1540 is coupled to the actuator 1506 in normal operation.

Figure 16:
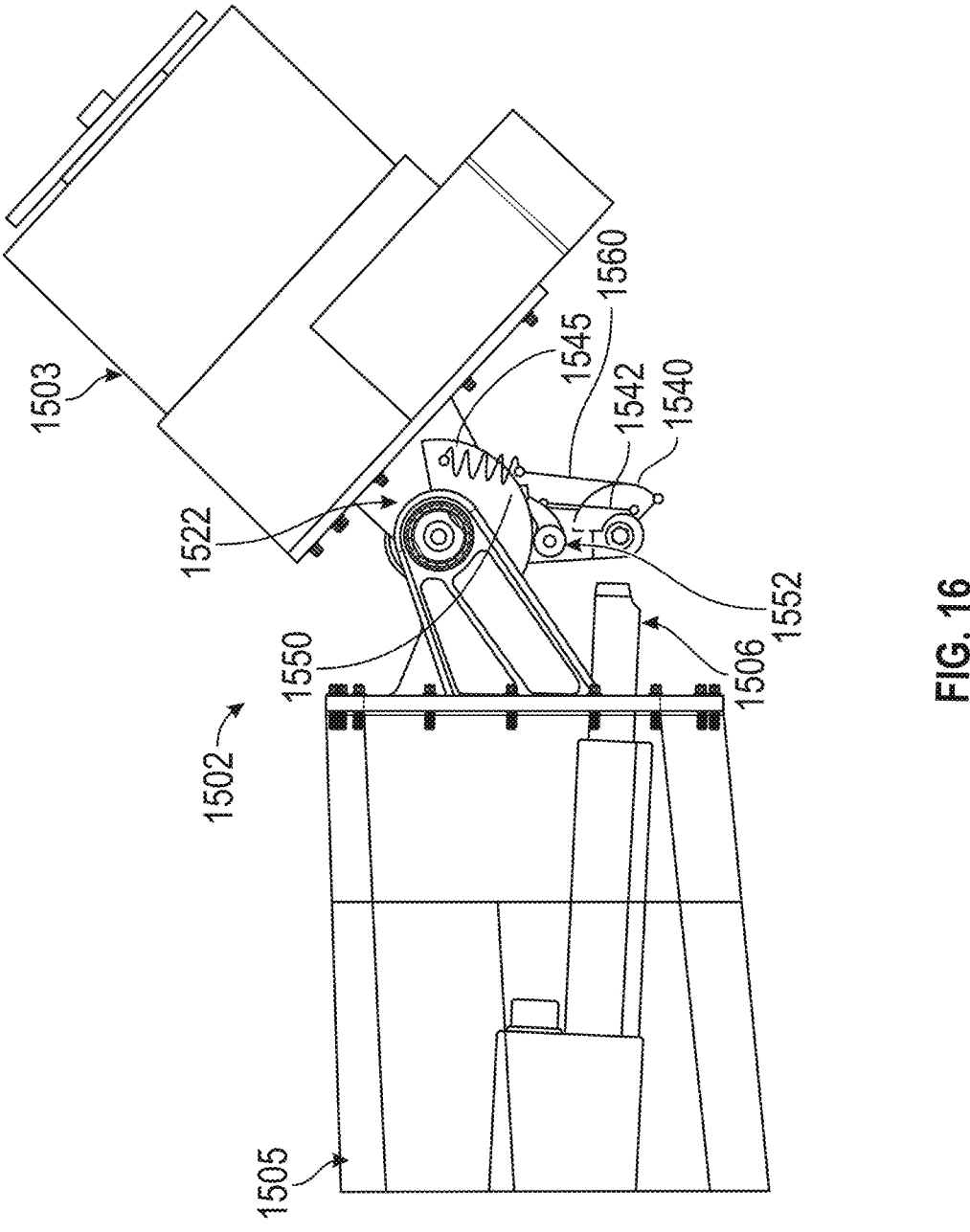
FIG. 16 shows the exemplary system of FIG. 15 in a second configuration, according to one or more examples of the disclosure.
Figure 17:
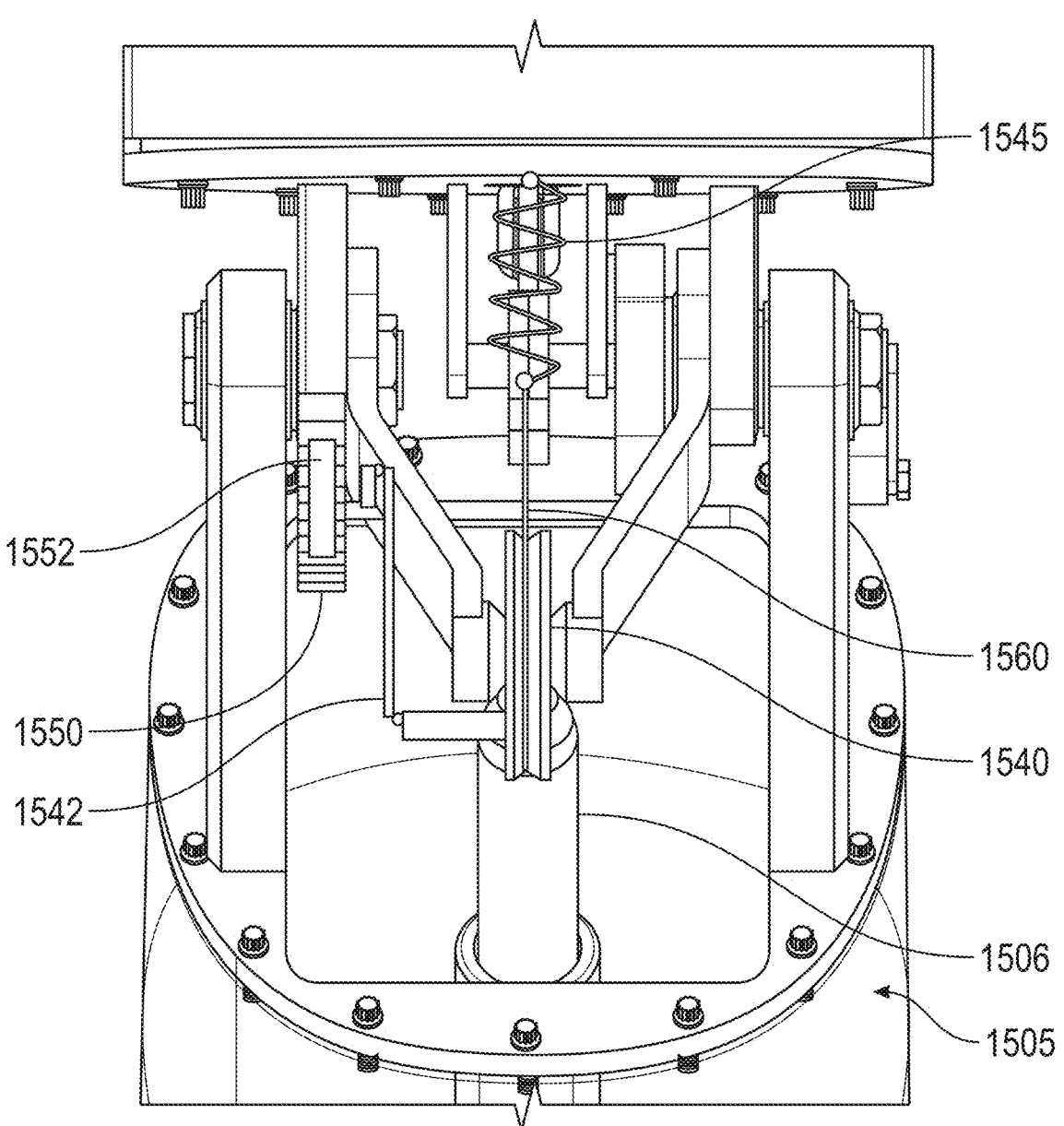
FIG. 17 shows a front view of the exemplary system of FIG. 15, according to one or more examples of the disclosure.

In the event that the actuator 1506 and the pulley 1540 become disconnected (e.g., the actuator 1506 becomes disconnected from the proprotor 1503), the pulley 1540 moves away from the actuator 1506 because of the bias from the spring 1545, as shown in the configuration of system 1502 shown in FIG. 16. Whereas the FIG. 15 shows the pawl 1552 not engaged with the sector gear 1550 and the pulley 1540 located adjacent to the actuator 1506, FIG. 16 shows the pawl 1552 engaged with the sector gear 1550 and the pulley 1540 no longer located adjacent to the actuator 1506. The tension spring 1545 can automatically draw the pulley 1540 away from the actuator 1506 in the event that the actuator 1506 and pulley 1540 become disconnected, thereby forcing the pawl 1552 to engage the sector gear 1550. When the pawl 1552 engages the sector gear 1550, the proprotor can be prevented from tilting further in one or both directions. By preventing further tilting in one or both directions, the system 1502 can prevent catastrophic failure from occurring should the actuator become disconnected from the proprotor without requiring redundant actuators or damping mechanisms. FIG. 17 shows a front view of the exemplary system of FIG. 15, according to one or more examples of the disclosure.

Figure 18B:
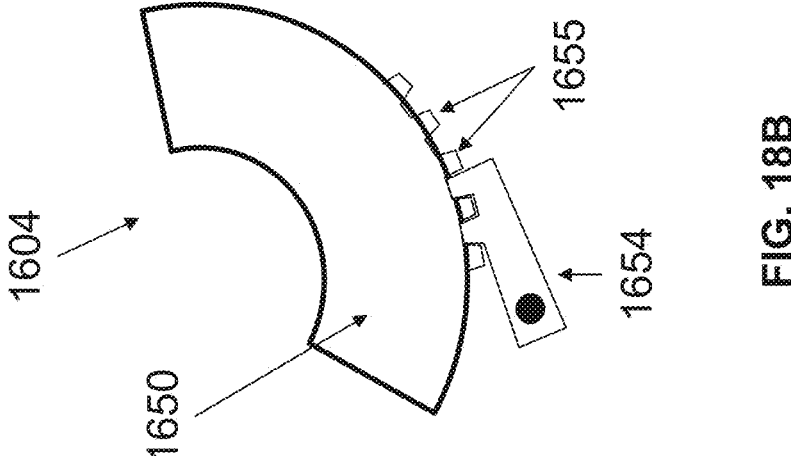
FIG. 18A shows an exemplary ratchet configuration and FIG. 18B shows an exemplary lock configuration for locking a proprotor in at least one direction.
Figure 18A:
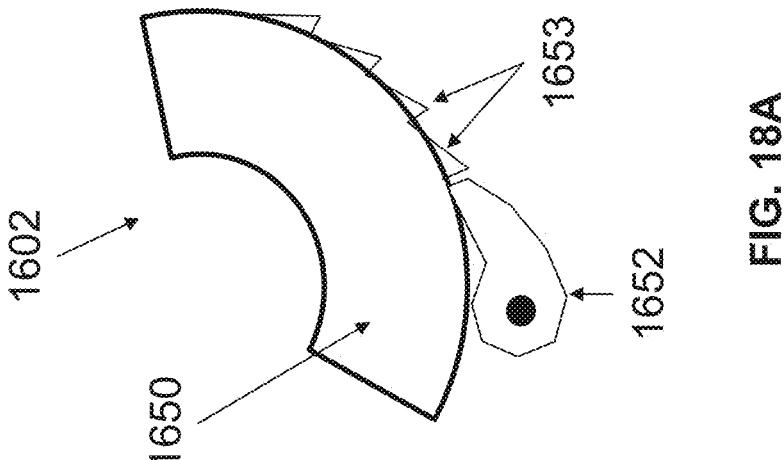

In one or more examples, the sector gear 1550 can be a ratchet with ridges that contact the pawl 1552. Such exemplary configurations are shown in FIG. 18A, which shows an exemplary ratchet configuration 1602, according to one or more examples of the disclosure. The ratchet configuration 1602 includes a sector gear 1650 that has a number of ridges 1653 that have a sloped side and a straighter side. The pawl 1652 rides over the sloped sides but catches on the straighter sides. As such, the proprotor will be ablet to tilt in a first direction (e.g., permitted to tilt counterclockwise in the illustrated configuration) but not a second direction (e.g., not permitted to tilt clockwise in the illustrated configuration). This may be useful in permitted the proprotor to move to a desired failure state tilt angle, such as a lift configuration, in which the proprotor can still be used during at least a portion of the flight. Such a ratchet mechanism could also be used with any of the damper configurations described above to provide a slower rate of tilt in the ratcheting direction.

Alternatively, the sector gear and pawl can be configured to lock the proprotor in both directions. FIG. 8B illustrates an exemplary lock configuration 1604 that has a sector gear 1650 that has a number of ridges 1655 that have two straight sides and a locking mechanism 1654 that engages the ridges 1655. When the locking mechanism 1654 is forced against the gear sector 1650, the locking mechanism will engage with the ridges 1655. The locking mechanism 1654 will be unable to ride past the ridges 1655 in either direction because of their straight sides, locking the sector gear 1650 (and, thereby, the proprotor) in position.

Accordingly, described herein are systems and methods for mechanically linking the tilt of a proprotor of an aircraft with the pitch of blades of the proprotor. The systems enable blade pitch to be tailored to the different operational regimes of the proprotor while avoiding the need for dedicated blade pitch adjustment actuators and the cost, weight, and failure points associated with such dedicated blade adjustment actuators.

Figure 19:
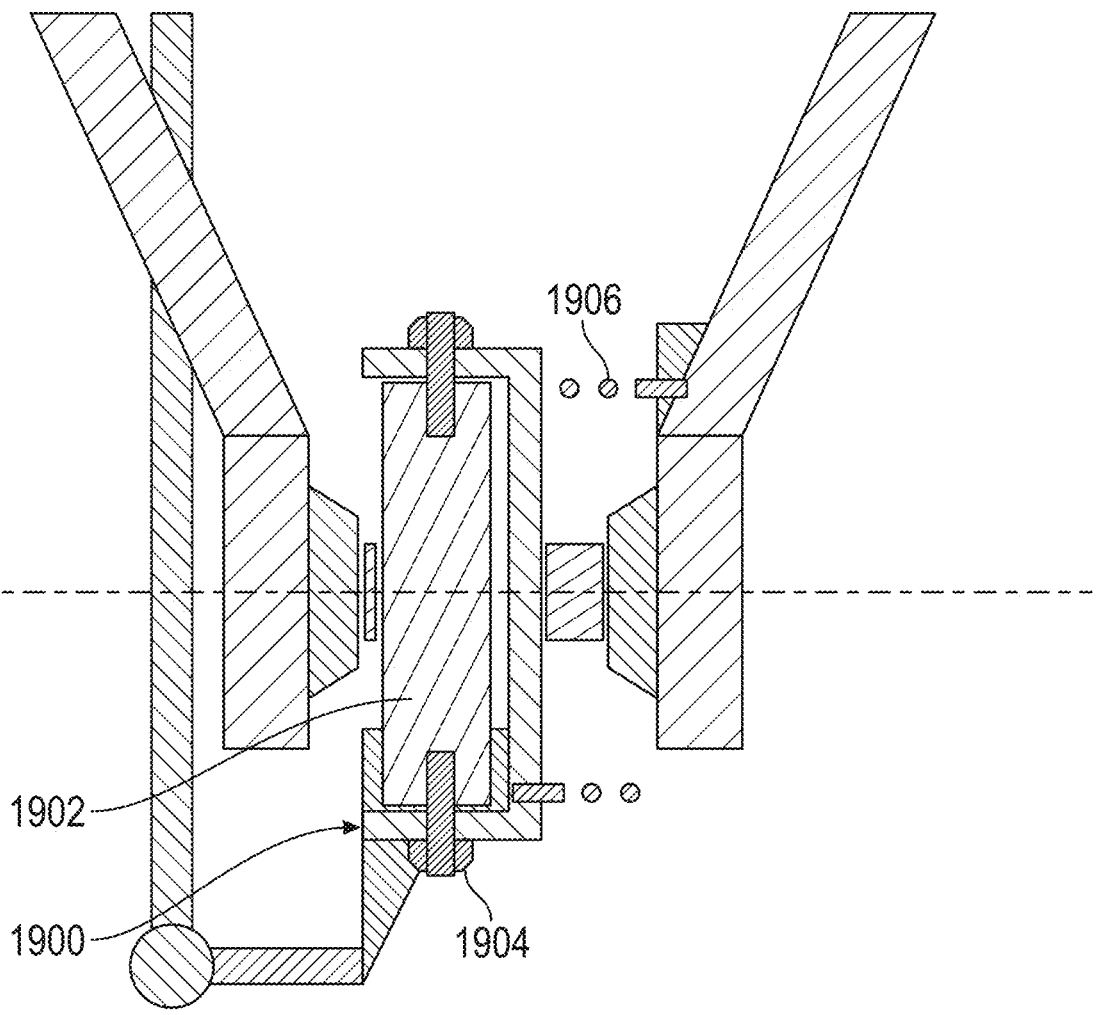
FIG. 19 shows a front view of an exemplary system, according to one or more examples of the disclosure.

FIG. 19 illustrates an alternative spring configuration and a feature for providing a "mid-life" check capability to ensure that the pawl mechanism is not jammed. In the illustrated embodiment, the mechanism 1900 can be bolted to the rod end fitting 1902 using one or more bolts 1904 or other removable attachment features. The bolts 1904 can be removed during routine maintenance to verify that the pawl engages the sector gear. The tilt actuator can then be driven to change the tilt of the rotor for some duration to confirm that the pawl engaged. The illustrated embodiment includes a torsion spring 1906 in place of a tension spring and cable, which can provide a weight savings, decrease required volume, and increase ruggedness.

The disclosure will now be further described by the following numbered embodiments, which are to be read in connection with the preceding description, and which do not limit the disclosure. The features, options, and preferences as described above apply also to the following embodiments.

Embodiment 1: A system for tilting a proprotor of an aircraft and simultaneously adjusting a pitch of blades of the proprotor, the system comprising: a first frame for mounting to the aircraft; a second frame for mounting the proprotor, wherein the second frame is rotatably mounted to the first frame at a rotation axis; a first gear located along the rotation axis and fixed in position relative to the first frame; a pinion that moves with the second frame and is engaged with the first gear such that the pinion can revolve around at least a portion of the first gear, wherein revolution of the pinion causes the pinion to rotate; a cam that is fixedly connected to the pinion such that the cam rotates with the pinion; and a control rod operatively coupled at a first end with the cam such that rotation of the cam can cause translation of the control rod, wherein the control rod can be coupled at a second end to the blades of the proprotor such that translation of the control rod alters the pitch of the blades.

Embodiment 2: The system of embodiment 1, wherein the first gear is attached to the first frame.

Embodiment 3: The system of embodiment 1 or embodiment 2, wherein the cam is mounted to a shaft that is fixedly connected to the pinion.

Embodiment 4: The system of embodiment 3, wherein the control rod comprises a clevis with a slot, wherein the shaft is positioned within the slot.

Embodiment 5: The system of embodiment 4, wherein the control rod is prevented from rotating via the engagement between the shaft and the clevis.

Embodiment 6: The system of any of embodiments 1-5, comprising a spring engaged with the control rod for biasing the control rod against the cam.

Embodiment 7: The system of embodiment 6, wherein the spring maintains the control rod in compression.

Embodiment 8: The system of embodiment 6, wherein the spring maintains the control rod in tension.

Embodiment 9: The system of any of embodiments 1-8, wherein the control rod comprises a follower that engages the cam.

Embodiment 10: The system of embodiment 9, wherein the follower comprises a roller.

Embodiment 11: The system of embodiment 10, wherein the follower engages an outer surface of the cam.

Embodiment 12: The system of embodiment 9, wherein the follower comprises a pin.

Embodiment 13: The system of embodiment 12, wherein the cam comprises a track and the pin engages the track.

Embodiment 14: The system of any of embodiments 9-13, wherein the cam comprises a circular portion such that the control rod does not translate when engaged with the circular portion of the cam.

Embodiment 15: The system of any of embodiments 1-14, comprising at least one actuator connected to the first frame and the second frame and configured to rotate the second frame relative to the first frame.

Embodiment 16: The system of embodiment 15, wherein the second frame comprises one or more arms connected to the at least one actuator.

Embodiment 17: The system of embodiment 15 or embodiment 16, wherein the at least one actuator is a linear actuator.

Embodiment 18: The system of embodiment 17, wherein the at least one actuator is a ball screw actuator.

Embodiment 19: The system of embodiment 15 or embodiment 16, wherein the at least one actuator is a rotary actuator.

Embodiment 20: The system of any of embodiments 1-19, wherein the pinion is rotationally coupled to the second frame.

Embodiment 21: The system of any of embodiments 1-20, wherein the first gear is connected to a fixed pin that is mounted to the first frame.

Embodiment 22: The system of embodiment 21, wherein the fixed pin is surrounded by a rotatable shaft that defines the rotation axis.

Embodiment 23: The system of embodiment 22, wherein the second frame is mounted to the rotatable shaft.

Embodiment 24: A VTOL aircraft comprising the system of any of embodiments 1-23

Embodiment 25: A VTOL aircraft comprising: a proprotor rotatably mounted to the aircraft at a rotational axis and comprising a plurality of blades; a first gear located along the rotational axis and fixed in position relative to the aircraft; a pinion that moves with the proprotor and is engaged with the first gear such that the pinion can revolve around at least a portion of the first gear, wherein revolution of the pinion causes the pinion to rotate; a cam that is fixedly connected to the pinion such that the cam rotates with the pinion; and a control rod operatively coupled at a first end with the cam such that rotation of the cam can cause translation of the control rod and operatively coupled at a second end to the blades of the proprotor such that translation of the control rod alters a pitch of the blades.

Embodiment 26: A method for operating a VTOL aircraft comprising: tilting a proprotor of the aircraft using the system of any of claims 1-23.

Embodiment 27: A method for operating a VTOL aircraft comprising: tilting a proprotor of the aircraft, wherein: the proprotor is mounted to a rotatable frame that is rotatably mounted to a fixed frame at a rotation axis, a first gear is located along the rotation axis and fixed in position relative to the fixed frame, a pinion moves with the proprotor and is engaged with the first gear such that the pinion can revolve around at least a portion of the first gear, wherein revolution of the pinion causes the pinion to rotate, a cam is fixedly connected to the pinion such that the cam rotates with the pinion, and a control rod is operatively coupled at a first end with the cam such that rotation of the cam can cause translation of the control rod, wherein the control rod is coupled at a second end to blades of the proprotor such that translation of the control rod alters the pitch of the blades.

Embodiment 28: An aircraft comprising: a tiltable proprotor that is tiltable between a lift position for providing lift for the aircraft and a forward flight position for providing forward propulsion for the aircraft; at least one actuator for adjusting a tilt angle of the tiltable proprotor; and at least one passive damper connected to the tiltable proprotor and configured to limit a rate of change of the tilt angle of the tiltable proprotor.

Embodiment 29: The aircraft of embodiment 28, wherein the at least one passive damper comprises a hydraulic or pneumatic cylinder.

Embodiment 30: The aircraft of embodiment 29, wherein the hydraulic or pneumatic cylinder is balanced so that the at least one passive damper does not apply a hydraulic or pneumatic bias to the tiltable proprotor when the tilt angle of the tiltable proprotor is not being adjusted.

Embodiment 31: The aircraft of embodiment 28, embodiment 29, or embodiment 30, wherein the at least one passive damper is configured to limit the rate of change of the tilt angle of the tiltable proprotor in both tilt directions.

Embodiment 32: The aircraft of any of embodiments 28-31, wherein the at least one actuator comprises a linear actuator.

Embodiment 33: The aircraft of any of embodiments 28-32, wherein the at least one actuator comprises a rotary actuator.

Embodiment 34: The aircraft of any of embodiments 28-33, comprising a boom, wherein the tiltable proprotor is tiltably mounted to the boom.

Embodiment 35: The aircraft of embodiment 34, comprising a fixed rotor mounted to the boom in a fixed position for providing lift.

Embodiment 36: The aircraft of embodiment 35, wherein the tiltable proprotor is mounted to a forward end of the boom and the fixed rotor is mounted to an aft end of the boom.

Embodiment 37: The aircraft of any of embodiments 34-36, wherein the boom comprises an outer shell and the at least one passive damper is at least partially housed within the outer shell.

Embodiment 38: The aircraft of any of embodiments 34-37, wherein the boom comprises a rib, and the at least one actuator and the at least one passive damper are positioned on opposite sides of the rib.

Embodiment 39: The aircraft of any of embodiments 34-38, wherein the boom is mounted to a wing of the aircraft inward of an end of the wing.

Embodiment 40: The aircraft of any of embodiments 28-39, wherein the tiltable proprotor is configured to tilt in an upward direction from the forward flight position to the lift position, and a force vector of the at least one passive damper extends beneath a tilt axis of the tiltable proprotor.

Embodiment 41: The aircraft of any of embodiments 28-40, comprising a plurality of tiltable proprotors and a plurality of passive dampers for the plurality of tiltable proprotors.

Embodiment 42: The aircraft of any of embodiments 28-41, wherein a range of the tilt angle of the tiltable proprotor is at least 90 degrees.

Embodiment 43: The aircraft of any of embodiments 28-42, wherein the aircraft comprises a single actuator for adjusting the tilt angle of the tiltable proprotor.

Embodiment 44: The aircraft of any of embodiments 28-43, wherein the at least one passive damper is configured to limit the rate of change of the tilt angle to a predetermined threshold value in an event in which the tiltable proprotor is disconnected from the at least one actuator during forward flight.

Embodiment 45: The aircraft of any of embodiments 28-44, wherein the tiltable proprotor is electrically powered.

Embodiment 46: The aircraft of any of embodiments 28-45, wherein the aircraft is a passenger aircraft.

Embodiment 47: A method for controlling an aircraft comprising controlling at least one actuator of the aircraft of any of embodiments 28-46 to adjust the tilt angle of the tiltable proprotor according to a command received at a controller of the aircraft.

Embodiment 48: A method for controlling an aircraft, the method comprising: receiving a command at a controller to adjust a tilt angle of a tiltable proprotor that is tiltable between a lift position for providing lift for the aircraft and a forward flight position for providing forward propulsion for the aircraft; and controlling at least one actuator to adjusting the tilt angle of the tiltable proprotor according to the command, wherein at least one passive damper is connected to the tiltable proprotor to limit a rate of change of the tilt angle of the tiltable proprotor.

Embodiment 49: An aircraft comprising: a tiltable proprotor that is tiltable between a lift position for providing lift for the aircraft and a forward flight position for providing forward propulsion for the aircraft; at least one actuator for adjusting a tilt angle of the tiltable proprotor; and at least one ratchet or lock for preventing movement of the tiltable proprotor in at least one direction.

Embodiment 50: The aircraft of embodiment 49, comprising the system of any of claims 1-23.

Embodiment 51: The system of any of embodiments 1-23, the aircraft of embodiment 25, or the aircraft of embodiments 28-46, comprising at least one ratchet or lock for preventing movement of the proprotor in at least one direction.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A proprotor tilting system, comprising:
a first gear fixed in position relative to a first frame;
a pinion that moves with a second frame and is engaged with the first gear such that the pinion revolves around at least a portion of the first gear, wherein revolution of the pinion causes the pinion to rotate;
a cam that is fixedly connected to the pinion such that the cam rotates with the pinion; and
a control rod operatively coupled at a first end with the cam such that rotation of the cam causes translation of the control rod to alter a pitch of blades.

2. The system of claim 1, wherein the first gear is attached to the first frame and the first frame is for mounting to the aircraft.

3. The system of claim 1, wherein the cam is mounted to a shaft that is fixedly connected to the pinion.

4. The system of claim 3, wherein the control rod comprises a clevis with a slot, wherein the shaft is positioned within the slot.

5. The system of claim 4, wherein the control rod is prevented from rotating via the engagement between the shaft and the clevis.

6. The system of claim 1, comprising a spring engaged with the control rod for biasing the control rod against the cam.

7. The system of claim 6, wherein the spring maintains the control rod in compression.

8. The system of claim 6, wherein the spring maintains the control rod in tension.

9. The system of claim 1, wherein the control rod comprises a follower that engages the cam.

10. The system of claim 9, wherein the follower comprises a roller.

11. The system of claim 10, wherein the follower engages an outer surface of the cam.

12. The system of claim 9, wherein the follower comprises a pin.

13. The system of claim 12, wherein the cam comprises a track and the pin engages the track.

14. The system of claim 9, wherein the cam comprises a circular portion such that the control rod does not translate when engaged with the circular portion of the cam.

15. The system of claim 1, comprising at least one actuator connected to the first frame and the second frame and configured to rotate the second frame relative to the first frame.

16. The system of claim 15, wherein the second frame comprises one or more arms connected to the at least one actuator.

17. The system of claim 15, wherein the at least one actuator is a linear actuator.

18. The system of claim 15, wherein the at least one actuator is a ball screw actuator.

19. The system of claim 15, wherein the at least one actuator is a rotary actuator.

20. The system of claim 1, wherein the pinion is rotationally coupled to the first frame and the first frame is for mounting to the aircraft.

21. The system of claim 1, wherein the first gear is connected to a fixed pin that is mounted to the first frame and the first frame is for mounting to the aircraft.

22. The system of claim 21, wherein the fixed pin is surrounded by a rotatable shaft that defines a rotation axis.

23. The system of claim 22, wherein a second frame for mounting the proprotor is mounted to the rotatable shaft.

24. A VTOL (Vertical Takeoff and Landing) aircraft comprising:
a pinion that moves with a proprotor and is engaged with a first gear such that the pinion revolves around at least a portion of the first gear, wherein revolution of the pinion causes the pinion to rotate;
a cam that is fixedly connected to the pinion such that the cam rotates with the pinion; and
a control rod operatively coupled at a first end with the cam such that rotation of the cam causes translation of the control rod to alter a pitch of blades.

25. A method of operating a VTOL (Vertical Takeoff and Landing) aircraft comprising:
tilting a proprotor of the aircraft, wherein:
a first gear is fixed in position relative to a fixed frame,
a pinion moves with the proprotor and is engaged with the first gear such that the pinion revolves around at least a portion of the first gear, wherein revolution of the pinion causes the pinion to rotate,
a cam is fixedly connected to the pinion such that the cam rotates with the pinion, and
a control rod is operatively coupled at a first end with the cam such that rotation of the cam causes translation of the control rod to alter a pitch of blades of the proprotor.

26. A proprotor tilting system, comprising:
a first frame for mounting to an aircraft;
a second frame for mounting a proprotor, wherein the second frame is rotatably mounted to the first frame;
a tilt actuator configured to tilt the second frame with respect to the first frame;
a cam configured to rotate when a tilt actuator tilts the second frame; and
a control rod operatively coupled at a first end with the cam such that rotation of the cam causes translation of the control rod to alter a pitch of blades.

27. The system of claim 26, wherein a gear is attached to the first frame.

28. The system of claim 26, wherein the cam is mounted to a shaft that is fixedly connected to a pinion.

29. The system of claim 28, wherein the control rod comprises a clevis with a slot, wherein the shaft is positioned within the slot.

30. The system of claim 29, wherein the control rod is prevented from rotating via the engagement between the shaft and the clevis.

31. The system of claim 26, comprising a spring engaged with the control rod for biasing the control rod against the cam.

32. The system of claim 31, wherein the spring maintains the control rod in compression.

33. The system of claim 31, wherein the spring maintains the control rod in tension.

34. The system of claim 26, wherein the control rod comprises a follower that engages the cam.

35. The system of claim 34, wherein the follower comprises a roller.

36. The system of claim 35, wherein the follower engages an outer surface of the cam.

37. The system of claim 34, wherein the follower comprises a pin.

38. The system of claim 37, wherein the cam comprises a track and the pin engages the track.

39. The system of claim 34, wherein the cam comprises a circular portion such that the control rod does not translate when engaged with the circular portion of the cam.

40. The system of claim 26, wherein the tilt actuator is connected to the first frame and the second frame and configured to rotate the second frame relative to the first frame.

41. The system of claim 40, wherein the second frame comprises one or more arms connected to the tilt actuator.

42. The system of claim 40, wherein the tilt actuator is a linear actuator.

43. The system of claim 40, wherein the tilt actuator is a ball screw actuator.

44. The system of claim 40, wherein the tilt actuator is a rotary actuator.

45. The system of claim 26, wherein a pinion is rotationally coupled to the second frame.

46. The system of claim 26, wherein a gear is connected to a fixed pin that is mounted to the first frame.

47. The system of claim 46, wherein the fixed pin is surrounded by a rotatable shaft that defines a rotation axis.

48. The system of claim 47, wherein the second frame is mounted to the rotatable shaft.

49. A VTOL (Vertical Takeoff and Landing) aircraft comprising:
   a frame for mounting a proprotor of the aircraft;
   a tilt actuator configured to tilt the frame;
   a cam configured to rotate when the tilt actuator tilts the frame; and
   a control rod operatively coupled at a first end with the cam such that rotation of the cam causes translation of the control rod to alter a pitch of blades.

50. A method of operating a VTOL (Vertical Takeoff and Landing) aircraft comprising:
   tilting, by a tilt actuator, a frame for mounting a proprotor of the aircraft, wherein:
   a cam is configured to rotate when the tilt actuator tilts the frame; and
   a control rod operatively coupled at a first end with the cam such that rotation of the cam causes translation of the control rod to alter a pitch of blades.

\* \* \* \* \*